United States Patent
Yamanouchi et al.

Patent Number: 5,307,108
Date of Patent: Apr. 26, 1994

[54] FILM DATA EXPOSURE DEVICE

[75] Inventors: Kenji Yamanouchi; Masao Nakamura; Makoto Ikeda, all of Hino, Japan

[73] Assignee: Konica Corporation, Tokyo, Japan

[21] Appl. No.: 707,913

[22] Filed: May 30, 1991

[30] Foreign Application Priority Data

Jun. 8, 1990 [JP] Japan .................. 2-150718
Jul. 24, 1990 [JP] Japan .................. 2-195888
Jul. 24, 1990 [JP] Japan .................. 2-195889
Jul. 31, 1990 [JP] Japan .................. 2-203405
Jul. 31, 1990 [JP] Japan .................. 2-203406

[51] Int. Cl.⁵ .................................. G03B 19/00
[52] U.S. Cl. ................................ 354/354; 355/41
[58] Field of Search ............... 354/354, 105; 355/41

[56] References Cited

U.S. PATENT DOCUMENTS 3,987,467 10/1976 Cowles .................. 354/105
4,449,805 5/1984 Sakurada et al. ........ 354/105
4,806,965 2/1989 Yamanouchi et al. ..... 355/41 X Primary Examiner—Michael L. Gellner
Assistant Examiner—Howard B. Blankenship
Attorney, Agent, or Firm—Jordan B. Bierman

[57] ABSTRACT

An apparatus for forming a latent image of an identification data in an edge portion of a new photosensitive film is disclosed here. The apparatus comprises editing unit to edit the identification data and an exposure position data, a memory to store the edited data, a register for registering an identification data from the memory and exposing unit to form a latent image of the registered identification data on the photosensitive film based on the exposure position data and synchronized with the feeding of the photosensitive film.

8 Claims, 23 Drawing Sheets

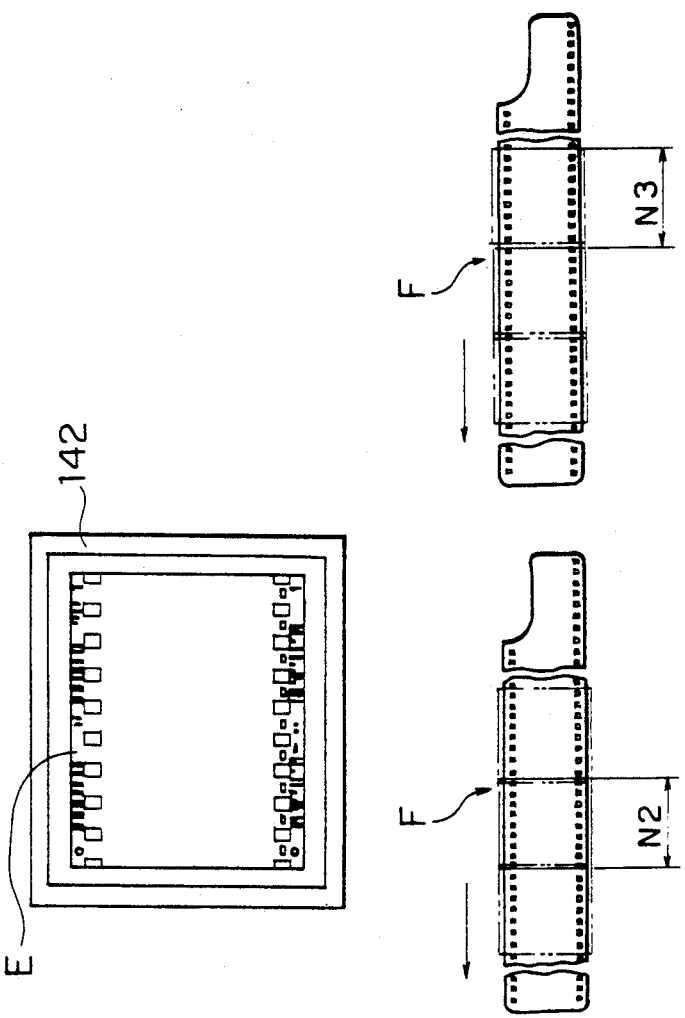
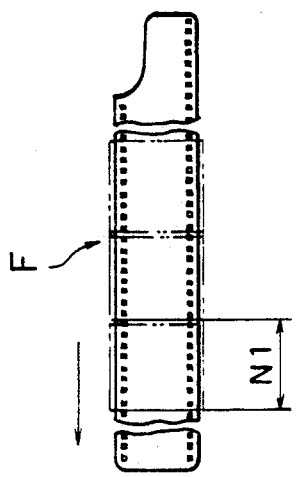
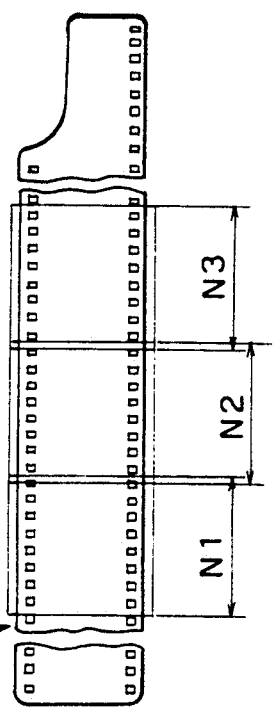
FIG. 6
FIG. 7a
FIG. 7b

FILM DATA EXPOSURE DEVICE

BACKGROUND OF THE INVENTION

The present invention relates to a film data exposure device for exposing identification data such as the frame numbers, brand, emulsion number, bar code, side line, characters, and symbols as latent images on unexposed films in the production process of roll films for photographic cameras.

Hereafter in the specification, the identification data are referred to as "latent image data."

Some film data exposure devices for exposing latent image data to unexposed films as mentioned above use original negative films, and there are also some which do not use such negative films.

A film data exposure device using a negative film exposes latent image data to an unexposed film using transmitted light through the negative film. When setting the emulsion number, for example, unnecessary numbers of 0 to 9 are blacked out.

A film data exposure device using no negative film exposes latent image data on an unexposed film as follows: the unexposed film is fed at a predetermined speed, the latent image data to be exposed is stored in a memory beforehand, a position signal is generated in synchronization with the feed of the unexposed film and the latent image data is read out of memory to form latent images on the unexposed film.

When exposing latent image data on unexposed films with light through the negative films, different negative films same in number as production lines are required to be prepared according to the brand, emulsion number, size, and type symbol, causing a difficulty in reservation of the arrangement space. Furthermore, replacement of negative films requires a long time.

In a film data exposure device using no negative films, the latent image data to be exposed to unexposed films are set and stored in an exposure device beforehand for each unexposed film, and the latent image data is read and exposed to unexposed films synchronized with the feeding speed thereof. Therefore, there is no need to prepare negative films in the number of production lines.

The type of films, for example, may be changed or added. If this occurs, the brand is changed or added. When latent image data is often added or changed, however, there is a problem imposed such that a film data exposure device, which stores beforehand latent image data to be exposed for each unexposed film, cannot deal with changing or addition of latent image data simply and quickly.

Furthermore, when latent image data is often added or changed, the latent image data, which is actually exposed, is required to be confirmed immediately after it is changed. In the case of a conventional data exposure device, the alarm device functions only when an error occurs, and it takes a lot of time to check the entire contents of the latent image data which is being exposed because it is required to be developed for visual check.

When exposing latent image data in a conventional film data exposure device, an unexposed film is pulled out from the feed source and a notch is cut one side of the unexposed film by a notch cutter whenever the film is fed at a predetermined length. The unexposed film is wound round an exposure drum which is engaged with perforations of the film, and the latent image data is exposed on the exposure drum.

The timing for exposing the latent image data is determined as follows: the notch sensor detects a notch of the unexposed film, the perforation sensor detects a perforation and then counts the number of perforations passing, and the exposure of the latent image data is started when the count reaches a predetermined value.

In a conventional data exposure device for exposing latent image data after it detects a notch and perforations, the perforation detection accuracy varies slightly because the unexposed film flutters during feed and the exposure position may be shifted. When the exposure position is shifted, even if slightly, since the latent image data is optically exposed on the exposure drum, the exposure light interferes with, for example, a tooth of the exposure drum engaged with perforations of the unexposed film, causing an inappropriate exposure.

It is possible to detect the position of each perforation at the exposure position of the exposure drum. At this position, a reflection sensor can be used but a transmission sensor cannot. The reflection sensor cannot detect the position of each perforation stably, and a modified perforation position sensor cannot reduce variations in the exposure position.

A conventional film processing machine for manufacturing photographic roll films is provided with a latent image exposure device for exposing latent image data such as the frame numbers, side mark, side line, DX bar code, and frame number bar code on unexposed films as a dot pattern. In the latent image exposure device perforations of an unexposed film engages with the sprocket teeth of the exposure drum and the film is fed at a predetermined speed by preventing variations in the film position.

FIG. 24 illustrates the relationship between the sprocket teeth of a conventional exposure drum and perforations of an unexposed film which are engaged with them.

In FIG. 24, the exposure drum 341 has sprocket teeth 342 which are located at even intervals in correspondence with the pitch of perforations 343, and an unexposed film F is wound round the exposure drum 341 at a predetermined winding angle of $\theta$. Since a tensile strength T is applied to the unexposed film F on the ascending and descending sides of the exposure drum 341, the unexposed film F is wound closely on the exposure drum 341, and the frictional force generated between the exposure drum 341 and the unexposed film F prevents the film from sliding on the drum.

In the above conventional exposure drum, the pitch "a" of the sprocket teeth 342 is equal to the pitch of perforations 343 of the unexposed film F which is set in consideration of an elongation caused by the tension applied to the film. The outer diameter D of the exposure drum 341 is obtained by calculating the theoretical length Lf of the part of the unexposed film F which is in contact with the periphery of the exposure drum 341 when the film is wound round the drum at a predetermined winding angle in consideration of the above elongation.

When the unexposed film F moves on the exposure drum 341, dot data of latent image characters stored in a control unit 344 of a latent image exposure device is read as the exposure drum 341 rotates, a light source LED in the control unit 344 selectively lights, the light is sent to a light projector 345 above the exposure drum 341 via an optical fiber, and a latent image is exposed to the predetermined film position.

As mentioned above, latent images for exposing are required to be exposed at the predetermined position of an unexposed film F with the constant size and at the predetermined position for perforations 343. FIG. 25 is an enlarged view of the latent image exposed on the unexposed film F. FIG. 25 shows a DX bar code latent image. Each DX bar code of a dot 0.095 mm in diameter, for example, is sequentially exposed to the unexposed film F at a pitch of 0.0475 mm as the film moves on the exposure drum.

When the pitch between dots for exposing is in error, the exposed graphic is deformed. The bar width d3 of DX bar codes is required to agree with the requirements 0.455±0.075 mm.

So as to satisfy the above requirements, the film position near a graphic for exposing is required to be measured sufficiently accurately. However, a color film for measuring, which visible rays cannot be used for and is not physically strong, cannot be directly measured. In the conventional film position measurement, therefore, when an unexposed film F of, for example, 12, 24, or 36 exposures is used as shown in FIG. 26, a notch indicating the constant size position is cut in the unexposed film F by a notch cutter 346 under the control of the control unit 344, the notch and perforation 343 are detected by a notch sensor 348 and a perforation sensor 349 before the film is fed to the exposure drum 341 via a guide roller 347, and these detection signals are supplied to the control unit 344. The pulse number of a rotary encoder 351, which is directly connected to a rotation shaft 350 of the exposure drum 341, for generating pulses according to the movement distance of the above unexposed film F is inputted to the control unit 344, and the position is measured by using those detection signals and counting the pulse number.

So as to measure the film position highly accurately, therefore, the movement distance of the unexposed film F as the exposure drum 341 rotates is required to be perfectly synchronized with the rotation angle of the exposure drum 341 which is measured by the rotary encoder 351. When the notch cutter 346 cuts notches, however, the unexposed film F may not move uniformly. The unexposed film F is required to feed intermittently because it is cut in a predetermined length, and as a result, a pulsatory motion may occur in the feed of the unexposed film F. When the acceleration applied to the unexposed film F is larger than the angular acceleration by the frictional force generated between the exposure drum 341 and the unexposed film F and by the moment of inertia by revolution of the exposure drum 341, a match may occur in synchronization between the unexposed film F and the exposure drum 341. When such a synchronous mismatch occurs, the latent image exposure position cannot be measured correctly.

As to the relationship between the sprocket teeth 342 of the conventional exposure drum 341 and the perforations 343 of the unexposed film F, the pitch "a" of the sprocket teeth 342 is equal to that of the perforations 343 as shown in FIG. 24. Therefore, so as to prevent such a synchronous mismatch, it is required that the sprocket teeth 342 are closely engaged with the perforations 343. However, from problems such as the machining accuracy of the sprocket teeth 342 and coloration, which is called a kick, of the film caused by one of the sprocket teeth 342 touching the edge of one of the perforations 343, the maximum distance d2 of the sprocket teeth 342 is 1.75 mm for the standard distance d1 of 1.98 mm of the perforations 343. In a conventional latent image exposure device, therefore, a gap of 0.23 mm occurs between the sprocket teeth 342 and the perforations 343, and the latent image exposure position may be shifted when a pulsatory motion occurs in the feed of the unexposed film F.

SUMMARY OF THE INVENTION

One of the objects of the present invention is to provide a film data exposure device for freely creating latent image data for exposing to an unexposed film as required and changing or adding latent images for exposing simply, quickly, and precisely in consideration of the above problems.

To solve the above problems, the present invention is characterized in that a film data exposure device for optically exposing latent image data to an unexposed film during feed comprises a data creation and editing means for creating and editing latent image data for exposing as required and setting and storing the exposure position on the unexposed film in a memory, a latent image data setting means for selecting and setting latent image data for actually exposing from the latent image data which is stored in the memory by the data creation and editing means, and a latent image exposure means for exposing the latent image data created by the data creation and editing means by setting of the latent image data setting means in synchronization with the movement of the unexposed film.

The present invention creates and edits latent image data for exposing as required, and sets and stores the exposure position on an unexposed film in a memory. The present invention selects latent image data for actually exposing from the stored latent image data, and exposes the selected latent image data at the predetermined position of the unexposed film in synchronization with the movement of the unexposed film.

Another object of the present invention is to provide a data exposure device for immediately checking the contents of latent image data which is being exposed on the unexposed film.

To solve the above problems, the present invention is characterized in that a data exposure device for optically exposing latent image data to a photosensitive material during feed comprises a latent image exposure means for exposing the set exposure latent image data in synchronization with the movement of the photosensitive material, a latent image data detection means for detecting the latent image during exposure, a memory means for storing the detected exposure latent image data, and a control means for storing the detected exposure latent image data in the memory means and allows a display means to display the exposure latent image data for a specified period.

The present invention exposes latent image data for exposing at the predetermined position of a photosensitive material in synchronization with the movement of the photosensitive material. The present invention detects the latent image data during exposure, stores the detected exposure latent image data in a storage memory, reads the exposure latent image data, and allows a display means to display the read data for a specified period. By doing this, the present invention can monitor the contents of the latent image data, which is being exposed, in synchronization with the movement of the photosensitive material.

Another object of the present invention is to provide a film data exposure device with a simple structure for improving the latent image exposure timing accuracy.

To solve the above problems, the present invention is characterized in that a film data exposure device for optically exposing latent image data on an unexposed film during feed on an exposure drum having teeth, which are engaged with perforations of the unexposed film, comprises a rotary encoder which rotates in synchronization with the exposure drum, the rotary encoder generates a pulse which coincides with the passing timing of each perforation of the unexposed film, and the latent image data exposure position is set according to the pulse.

In the present invention, teeth of an exposure drum are engaged with perforations of an unexposed film, and a rotary encoder, which rotates in synchronization with the exposure drum, generates a pulse which coincides with the passing timing of each perforation of the unexposed film during feed. The latent image data exposure position is set according to the pulse generated by the rotary encoder, and the latent image data is exposed at the predetermined position of the unexposed film.

Another object of the present invention is to eliminate the above defects of a latent image exposure device of a conventional film processing machine. Another object of the present invention is to install a flywheel with a predetermined moment of inertia prior to an exposure drum of a latent image exposure device of a film processing machine so as to make the tension of an unexposed film F on the exposure drum stable and to ensure the frictional force between the exposure drum and the unexposed film F so as to eliminate mutual sliding.

Another object of the present invention is to install a flywheel with a predetermined moment of inertia behind the exposure drum so as to make the tension of the unexposed film F on the exposure drum stable and to ensure the frictional force between the exposure drum and the unexposed film F so as to eliminate mutual sliding.

Another object of the present invention is to ensure the frictional force between the exposure drum and the unexposed film F and to provide a means for applying a predetermined torque to the rotation shaft of the exposure drum in the film feed direction so as to keep the sprocket tooth pressed against the front edge of the perforation in the feed direction during feed.

Another object of the present invention is to ensure the frictional force between the exposure drum and the unexposed film F and to provide a means for applying a predetermined torque to the rotation shaft of the exposure drum in the reverse direction to the film feed direction so as to keep the sprocket tooth pressed against the back edge of the perforation in the feed direction during feed.

Another object of the present invention is to make the contact length between the exposure drum and the unexposed film shorter than the theoretical contact length by 0.2 to 0.35 mm so as to keep the sprocket tooth for feeding the unexposed film to the exposure drum pressed against the front edge of the perforation in the feed direction.

Another object of the latent image exposure device is to make the contact length longer than the theoretical contact length by 0.2 to 0.35 mm so as to keep the sprocket tooth for feeding the unexposed film to the exposure drum pressed against the back edge of the perforation in the feed direction.

To solve the above problems, a latent image exposure device of a film processing machine for optically exposing latent image data using an exposure drum having sprocket teeth engaged with perforations of an unexposed film is characterized in that the device has a flywheel for winding the unexposed film prior to the exposure drum for feeding the unexposed film and the lower limit of the moment of inertial of the flywheel is the moment of inertia which is obtained from the conditions for preventing the unexposed film from sliding on the exposure drum and the upper limit is three times of the lower limit.

The latent image exposure device of the film processing machine is characterized in that the flywheel having the moment of inertia is installed behind the exposure drum.

The latent image exposure device of the film processing machine is characterized in that the device has a means for applying a predetermined torque which is equivalent to or more than the frictional force generated between the exposure drum and the unexposed film to the rotation shaft of the exposure drum in the film feed direction for a specified period.

The latent image exposure device of the film processing machine is characterized in that the device has a means for applying a predetermined torque which is equivalent to or more than the frictional force generated between the exposure drum and the unexposed film to the rotation shaft of the exposure drum in the reverse direction to the film feed direction for a specified period.

The latent image exposure device of the film processing machine is characterized in that the device has an exposure drum wherein the contact length when the unexposed film is wound at a predetermined angle is shorter than the theoretical contact length obtained from the winding angle by 0.2 to 0.35 mm.

The latent image exposure device of the film processing machine is characterized in that the device has an exposure drum wherein the contact length when the unexposed film is wound at a predetermined angle is longer than the theoretical contact length obtained from the winding angle by 0.2 to 0.35 mm.

The latent image exposure device of the film processing machine winds the unexposed film round the flywheel and feeds the unexposed film to the exposure drum by applying a predetermined tensile strength to the unexposed film.

The latent image exposure device of the film processing machine winds the unexposed film fed from the exposure drum round the flywheel and feeds the unexposed film by applying a predetermined tensile strength to the film between the exposure drum and the flywheel.

The latent image exposure device of the film processing machine applies a predetermined torque to the rotation shaft of the exposure drum in the unexposed film feed direction for a specified period, rotates the sprocket tooth against the frictional force generated between the unexposed film and the exposure drum before starting feed, and keeps the sprocket tooth pressed against the front edge of the corresponding perforation in the feed direction.

The latent image exposure device of the film processing machine applies a predetermined torque to the rotation shaft of the exposure drum in the reverse direction to the unexposed film feed direction for a specified period, rotates the sprocket tooth against the frictional force generated between the unexposed film and the exposure drum before starting feed, and keeps the sprocket tooth pressed against the front edge of the corresponding perforation in the feed direction.

The latent image exposure device of the film processing machine allows the sprocket teeth of the exposure drum whose contact length with the unexposed film which is wound at a predetermined angle is shorter than the theoretical contact length by 0.2 to 0.35 mm to engage with the perforations of the unexposed film during feed.

Furthermore, the latent image exposure device of the film processing machine allows the sprocket teeth of the exposure drum whose contact length with the unexposed film which is wound at a predetermined angle is longer than the theoretical contact length by 0.2 to 0.35 mm to engage with the perforations of the unexposed film during feed.

The latent image exposure device of the film processing machine applies a torque to the rotation shaft of the exposure drum in the unexposed film feed direction, and keeps the sprocket tooth pressed against the front edge of the corresponding perforation in the feed direction during feed.

The latent image exposure device of the film processing machine applies a torque to the rotation shaft of the exposure drum in the reverse direction to the unexposed film feed direction, and keeps the sprocket tooth pressed against the back edge of the corresponding perforation in the feed direction during feed.

BRIEF DESCRIPTION OF THE DRAWINGS

FIG. 6 shows a display screen of a CRT display unit, and FIGS. 7-a and 7-b show another embodiments of exposure latent image data display.

FIG. 13 is a side view showing the configuration of an exposure unit of a latent image exposure device of a constant size film processing machine of the present invention.

DETAILED DESCRIPTION OF PREFERRED EMBODIMENTS

The embodiments of the present invention will be described hereunder.

Figure 1:
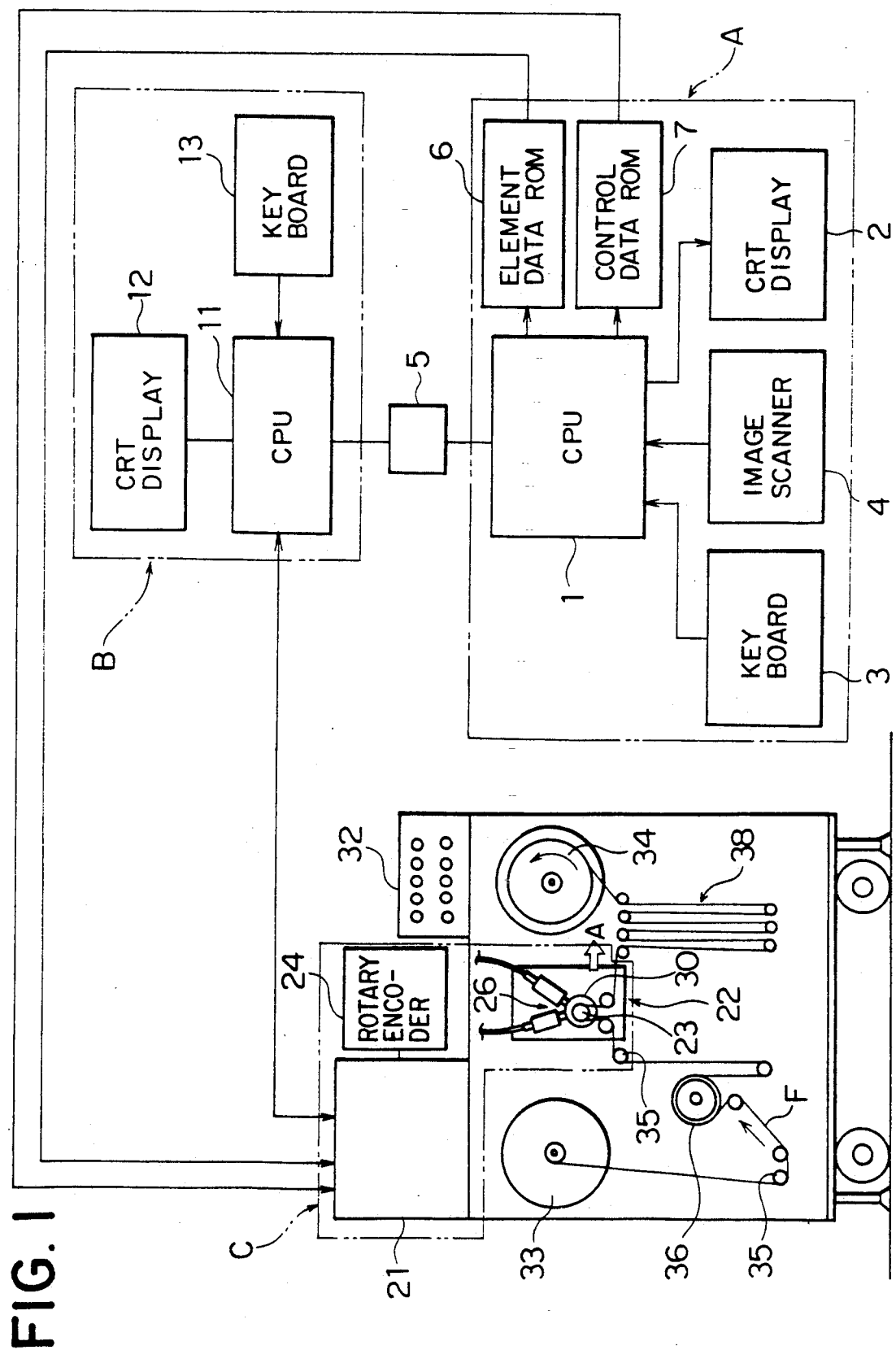
FIG. 1 is a schematic view of a film data exposure device.
Figure 2:
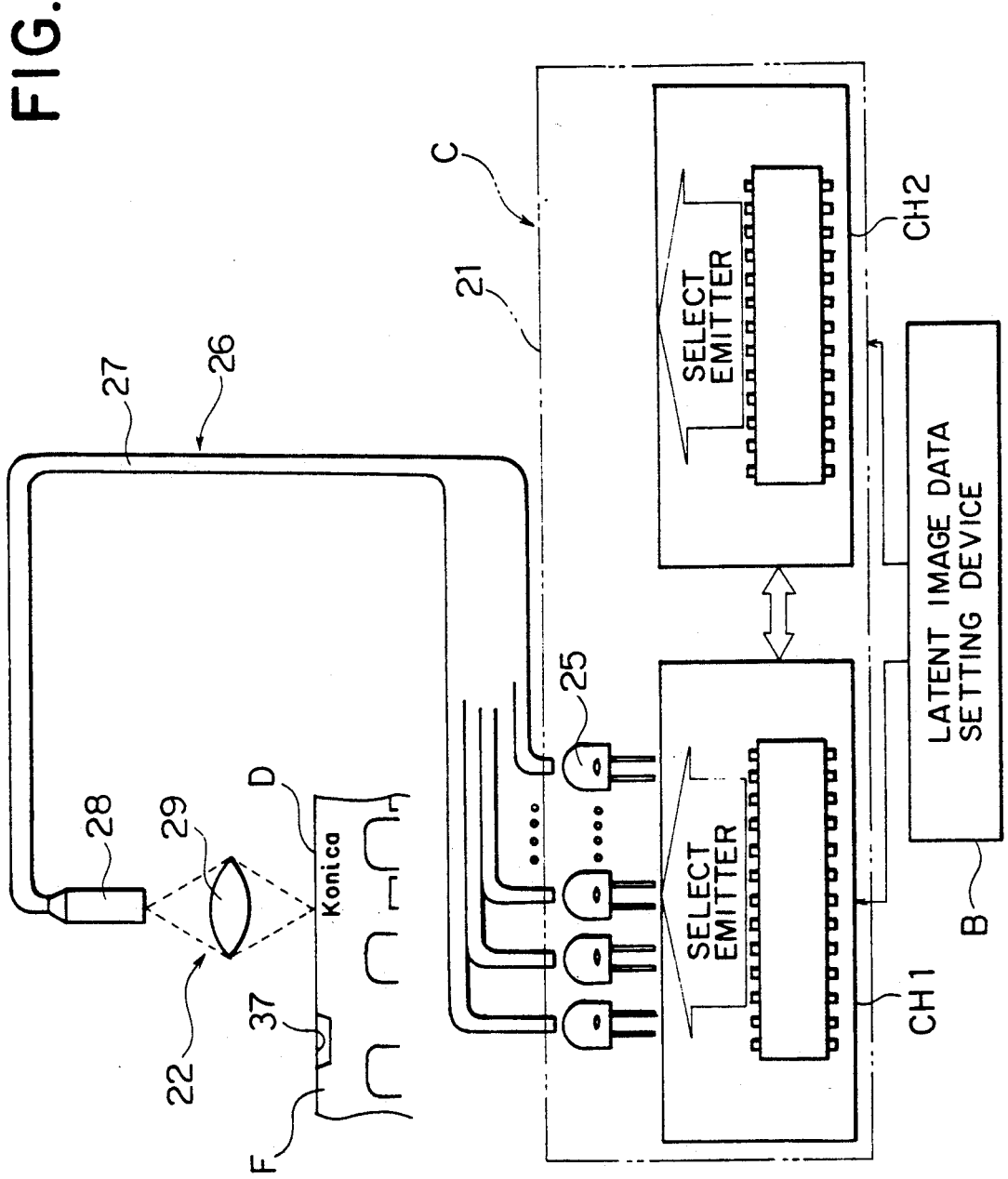
FIG. 2 is a drawing illustrating exposure of latent image data.

FIG. 1 is a schematic view of a film data exposure device, and FIG. 2 is a drawing illustrating exposure of latent image data.

The film data exposure device comprises a data creation and editing means A for creating and editing latent image data for exposing as required and setting and storing the exposure positron on an unexposed film in a memory, a latent image data setting means B for selecting and setting latent image data for actually exposing from the latent image data stored in the memory by the data creation and editing means A, and a latent image exposure means C for exposing the latent image data which is created by the data creation and editing means A by setting of the latent image data setting means B in synchronization with the movement of an unexposed film.

The data creation and editing means A comprises, for example, a personal computer comprising a computer body 1, a CRT display unit 2, a character information input means 3 comprising a keyboard, and an image information input means 4 comprising an image scanner.

The computer body 1 of the data creation and editing means A has various functions as shown below.

(a) Element character and graphic data creation mode

The data creation and editing means A converts characters or graphics inputted from the character information input means 3 or the image information input means 4 to dot data and creates data for latent image exposure as characters.

(b) Element character and graphics data composition mode

The data creation and editing means A composes characters and creates character strings or graphics.

(c) Composite element data ROM mode

The data creation and editing means A selects data created in (a) or (b) sequentially and creates an element character graphic ROM 6. The element character graphic ROM 6 is set in the latent image exposure means C.

(d) Management ROM creation mode

The data creation and editing means A creates an element character graphic management ROM 7 wherein data numbers and addresses contained in the element character graphic ROM 6 are written. The element character graphic management ROM 7 is set in the latent image exposure means C.

(e) Character and graphic array data creation mode

The data creation and editing means A sets the location on an unexposed film for exposing latent image data created in (b) or (c), and creates an array data ROM disk 5 which stores array data. The ROM disk 5 is set in the latent image data setting means B. The ROM disk 5 in the latent image data setting means B can be accessed at a high speed when the data is required; that is, the ROM disk can be used so as to set data quickly. Another memory means such as a floppy disk or hard disk can be naturally used. Thereafters each character array can be seen as graphics on the CRT display unit 2.

The latent image data setting means B comprises, for example, a personal computer comprising a computer body 11, a CRT display unit 12, and a character information input means 13 comprising a keyboard. The latent image data setting means B is installed in correspondence with the latent image exposure means C, and the ROM disk 5, which is created by the data creation and editing means A beforehand, is set in the computer body 11 of the latent image data setting means B. The ROM disk 5 stores the exposure data configuration for each film type. The operator can set the type, size, and brand of films, which are to be manufactured next, interactively with the CRT display unit 12 using the character information input means 13 comprising a keyboard. According to the set contents, the latent image data setting means B selects latent image data from the ROM disk 5 using the software of the computer body 11, and transfers the latent image data to a control unit 21 of the latent image exposure means C. In this case, the operator can use a film type setting bar code reader so as to shorten the setting time and prevent a setting error. The latent image exposure means C reads the patrone bar code of the production line and checks the transferred data with the film type and size.

The latent image data setting means B sets the film type as well as displays film type setting information, which is sent from the latent image exposure means C in real time, or error contents when an error occurs on the CRT display unit 12. The latent image data setting means B also stores past error contents, which can be checked by using the keyboard of the character information input means 13.

The latent image exposure means C comprises a control unit 21 and an exposure unit 22 and exposes latent image data D created by the data creation and editing means A by setting of the latent image data setting means B in synchronization with the movement of an unexposed film F. The control unit 21 is installed on the top of an equipment body 31 and an operation panel 32 is also installed on the top of the equipment body 31. The control unit 21 loads data of the element character graphic ROM 6 set in the control unit 21 into a RAM, which stores data corresponding to a film, using a CPU, for example, according to the information indicating the location on an unexposed film F where selected latent image data sent from the latent image data setting means B is to be placed with reference to the information of the element character graphic management ROM 7.

The RAM, which stores data corresponding to a film, comprises two channels, CH1 and CH2. One of them stores data which is being used for exposure and the other stores data which is scheduled to be used for the next exposure. The two channels are alternately used whenever the exposure data is changed. For conversion to the RAM by the CPU, a channel, which is not used for exposure during loading, is used. When two RAMS, which store data corresponding to a film respectively, are used, the next exposure data can be stored in the RAM beforehand and the exposure data can be changed instantaneously by changing the electrical information path. When a dedicated RAM storing data corresponding to a film is used, the exposure data can be read at a high speed without using the CPU. By doing this, the exposure speed can be increased.

The exposure unit 22 is installed inside the equipment body 31 which is a darkroom. A source winding reel 33 and a winding reel 34 are set in the equipment body 31. A perforated unexposed film F wound round the source winding reel 33 is wound round the winding reel 34 at a predetermined speed via guide rollers 35. A rotary notch cutter 36, which is mechanically driven, is installed between the source winding reel 33 and the exposure unit 22. The rotary notch cutter 36 forms notches indicating a cutting Position on an unexposed film F. The notch interval varies with the film size. The latent image exposure start position is determined on the basis of the notch position, and the cutting position is made to coincide with the latent image position when the unexposed film is cut into a constant size in the future. A dancer roller 38 is installed between the exposure unit 22 and the winding reel 34 so as to absorb the difference between the film feed speed at the exposure unit 22 and the winding speed of the winding reel 34.

In the exposure unit 22, a rotary encoder 24 is directly connected to an exposure sprocket 23 which detects the movement of the unexposed film F, a signal from the rotary encoder 24 is supplied to the control unit 21, and an internal counter thereof generates an address for accessing the RAM of the control unit 21 storing data corresponding to a film so as to read the data of the RAM. The read latent image data is connected to a plurality of inner light source LEDS 25, and one of the light source LEDs 25 selectively emits light depending on the latent image data.

In an external optical system 26 as shown in FIG. 2, light of one of the light source LEDs 25 is sent via a fiber 23, and an image is formed on the film surface from an optical fiber head 28 via a lens 29. A formed image changes sequentially as the unexposed film F moves, and the character and graphic latent image data D stored in the memory is reproduced on the unexposed film F. In the latent image exposure means C., a feed perforation of the unexposed film F is engaged with a pawl of the sprocket 23, and the unexposed film F is fed in the direction of the arrow by the rotation of the sprocket 23. The rotation force is applied to the sprocket 23 from a torque motor 30 in the film feed direction via the shaft of the sprocket 23, and the sprocket 23 is provided with a stable forward tension for example, during feed stop. Therefore, the pawl of the sprocket 23 is engaged with the front edge of the feed perforation of the unexposed film F in the feed direction, and the unexposed film F is fed in correct synchronization with the sprocket.

Figure 3:
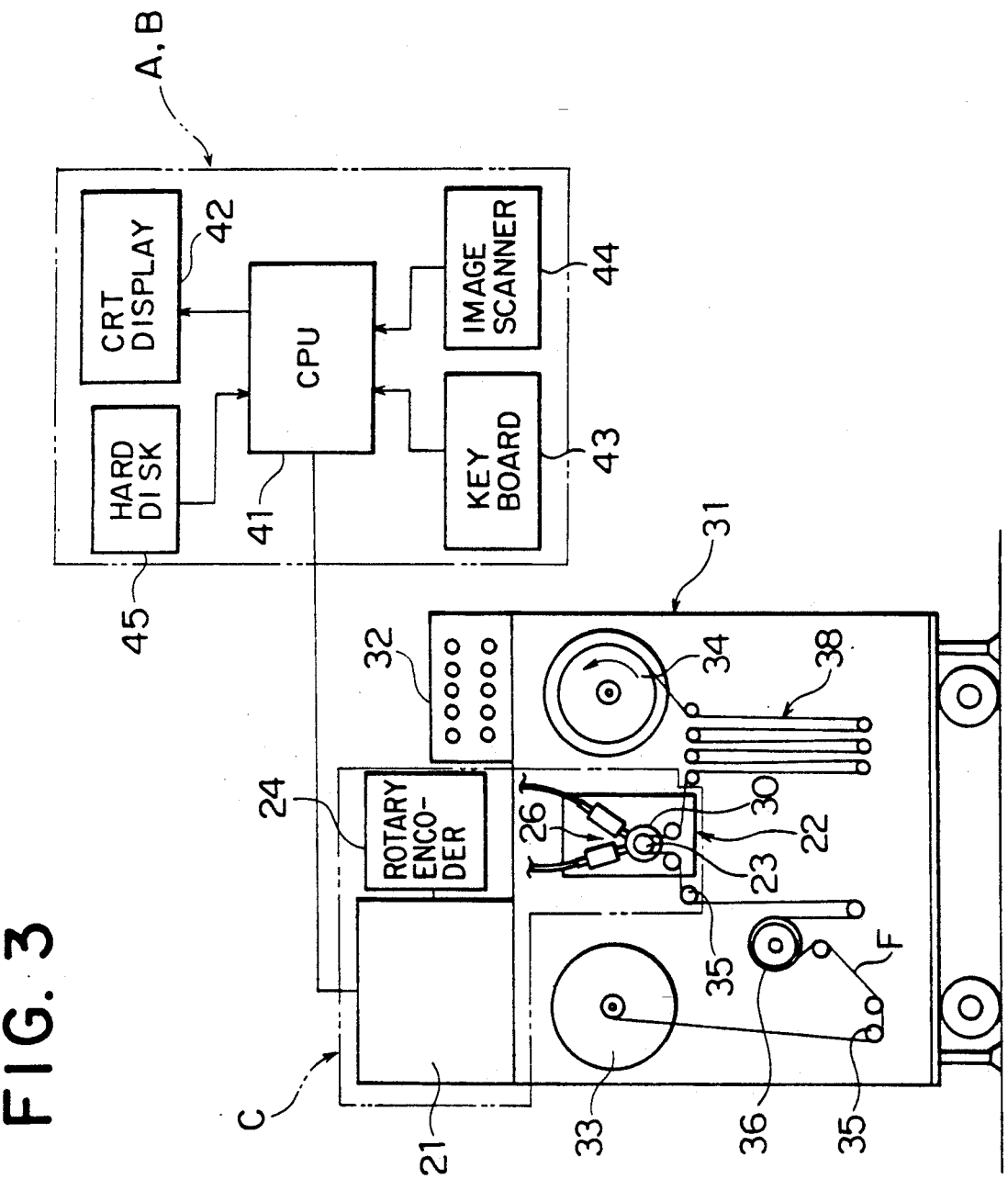
FIG. 3 is a schematic view of another embodiment of a film data exposure device.

FIG. 3 is a schematic view of another embodiment of a film data exposure device.

In this embodiment, the data creation and editing means A and the latent image data setting means B are installed in a personal computer, which comprises a character information input means 43 comprising a computer body 41, a CRT display unit 42, and a keyboard, an image information input means 44, and a hard disk 45.

The computer body 41 creates and edits latent image data for exposing as required, sets the exposure position on an unexposed film, and stores it on the hard disk 45. The personal computer selects and sets latent image data for actually exposing from the latent image data stored on the hard disk 45, and sends the selected latent image data to the control unit 21 of the latent image exposure means C via a communication line.

Since the data creation and editing means A and the latent image data setting means B are installed in a personal computer as mentioned above and the hard disk 45 is provided, there is no need to set the element character graphic ROM 6 or the element character graphic management ROM 7 in the latent image exposure means C, providing an easy operation.

Since the present invention, as described above, creates and edits latent image data for exposing as required, sets and stores the exposure position on an unexposed film in a memory, selects latent image data for exposing actually from the stored latent image data, and exposes the selected latent image data at the predetermined position of the unexposed film in synchronization with the movement of the unexposed film, latent image data for exposing on the unexposed film can be freely created as required and latent image data for exposing can be changed and added simply and quickly.

The next embodiment of a data exposure device of the present invention will be described with reference to the accompanying drawings hereunder.

Figure 4:
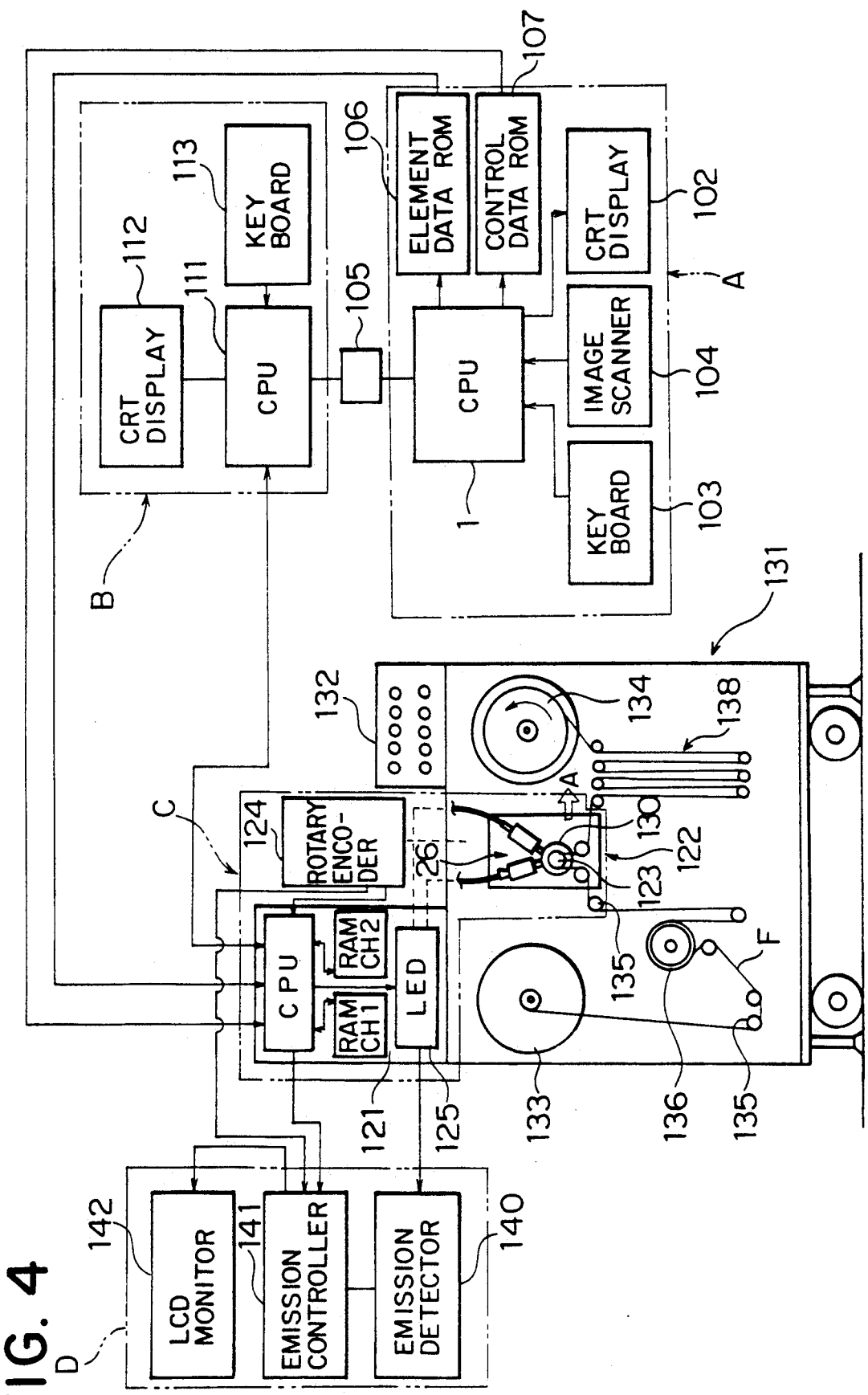
FIG. 4 is a schematic view of a data exposure device.
Figure 5:
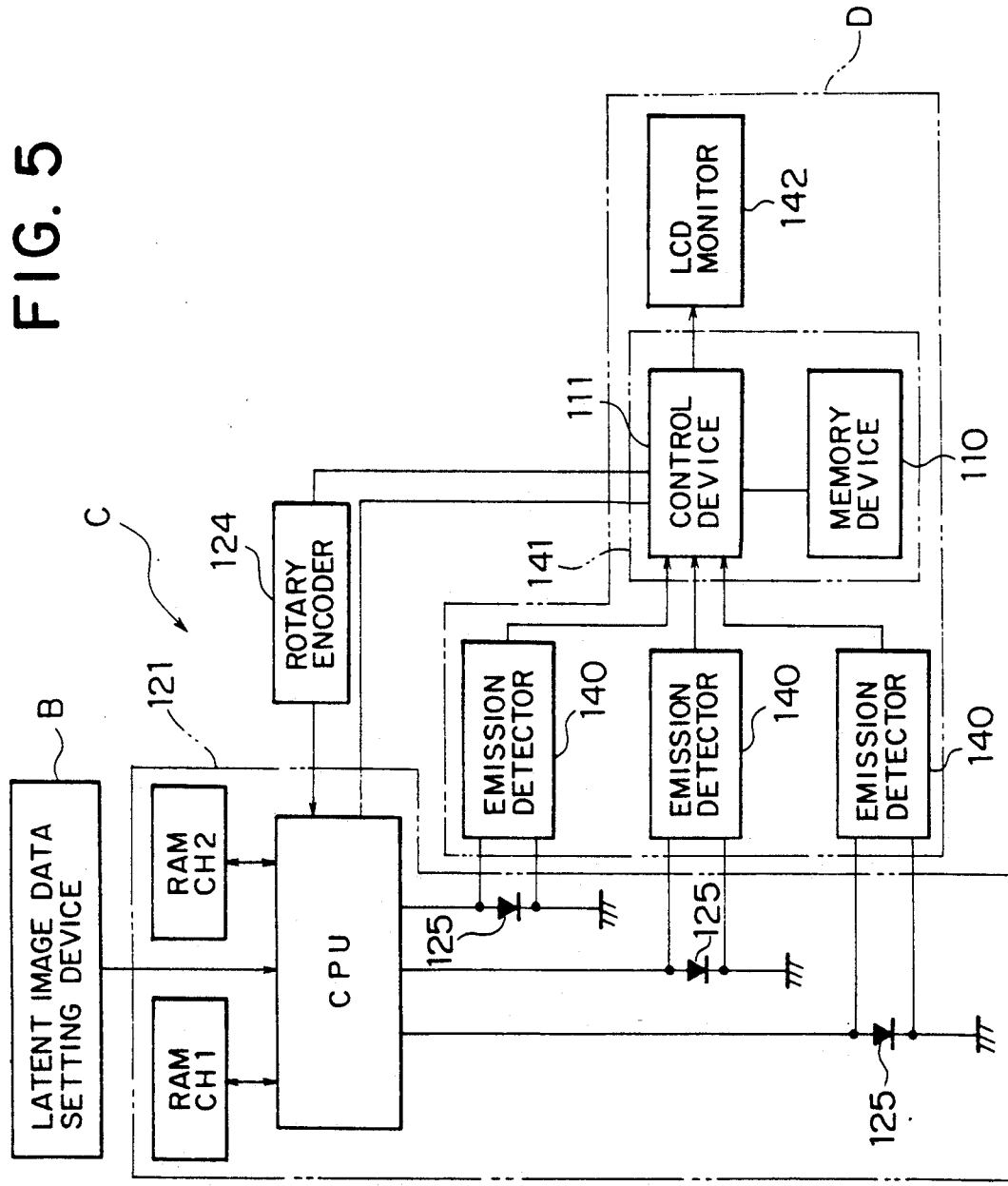
FIG. 5 is a block diagram for explaining the configuration of a latent image exposure monitor means.

FIG. 4 is a schematic view of a data exposure device, FIG. 5 is a block diagram for explaining the configuration of a latent image exposure monitor means, and FIG. 6 shows a display screen of a liquid crystal display unit.

In FIGS. 4 and 5, explanations of the parts which are described in FIGS. 1 and 2 are omitted. The operator sets the type, size, and brand of films which are scheduled to be manufactured next interactively with a CRT display unit 112 using a character information input means 113 comprising a keyboard. Latent image data of an array data ROM disk 7 is selected by the software of a computer body 111 according to the set contents, and exposure latent image data E is transferred to an exposure control unit 121 of the latent image exposure means C. In this case, the operator can use a film type setting bar code reader so as to shorten the setting time and prevent a setting error. The latent image exposure means C reads the patrone bar code of the production line and checks the transferred data with the film type and size.

The latent image data setting means B sets the film type as well as displays film type setting information which is periodically sent from the latent image exposure means C. The latent image data setting means B displays the presence or absence of an error in the data exposure device, which is sent from the latent image exposure monitor means D, on the CRT display unit 112. The latent image data setting means B also stores past error data, which can be checked by using the keyboard of the character information input means 113.

The latent image exposure means C comprises an exposure control unit 121 and an exposure unit 122, and exposes the exposure latent image data E created by the data creation and editing means A by setting of the latent image data setting means B in synchronization with the movement of the unexposed film F.

In the exposure unit 122 of the latent image exposure means C, a feed perforation of the unexposed film F is engaged with a pawl of the sprocket 123, and the unexposed film F is fed in the direction of the arrow by the rotation of the sprocket 123. The rotation force is applied to the sprocket 123 from a torque motor 30 in the film feed direction via the shaft of the sprocket 123, and the sprocket 123 is provided With a stable forward tension, for example, during feed stop.

Therefore, the pawl of the sprocket 123 is engaged with the front edge of the feed perforation of the unexposed film F in the feed direction, and the unexposed film F is fed in correct synchronization with the sprocket.

In this way, the contents of the exposure latent image data E, which are exposed to the unexposed film E, are successively sent to the latent image exposure monitor means D comprising an emission detector 140, an emission monitor control unit 141, and a liquid crystal display unit 142. FIG. 5 shows the emission detector 140, the emission monitor control unit 141, and the liquid crystal display unit 142.

The emission detector 140 constitutes a latent image data detection means for detecting exposure latent image data which is being exposed. The emission monitor control unit 141 comprises a memory means 110 for storing detected exposure latent image data and a control means 111 for storing the detected exposure latent image data in the memory means 110 and displaying it on the liquid crystal display unit 142 which displays data for a specified period.

The control means 111 of the emission monitor control unit 141 is supplied with exposure latent image data E for loading into the RAM of the exposure control unit 121 and with actual exposure latent image data E from the emission detector 140. The control means ill compares the inputted exposure latent image data E and the emission signal, which is actually emitted from the light source LED 25 and inputted via the emission detector 140, according to an address signal generated from the rotary encoder 124, and displays an error message on the CRT display unit 121 when an error is found in the emission signal.

The memory means 110 stores the entire or a part of the exposure latent image data E corresponding to a film according to the emission signal which is actually emitted from the light source LED 125 and inputted from the emission detector 140 into the control means 111. The control means Ill reads the information stored in the memory means 110 and displays images of the exposure latent image data E, which are actually exposed to the unexposed film E, on the liquid crystal display unit 142.

The latent image exposure monitor means D will be described in detail hereunder. In FIG. 5, an emission detector 140 is electrically connected to both ends of each LED 125 installed in the exposure control unit 121 so as to detect a voltage across both ends or a current flowing between both ends. The latent image exposure monitor means D sends the detected emission signal to the control means 111 of the emission monitor control unit 141. In this case, the contents of the exposure latent image data E detected by the control means 111, which are displayed on the liquid crystal display unit 142 in real time, cannot be checked because the film feed rate is extremely high.

Therefore, the memory means 110 stores the entire or a part of the exposure latent image data E corresponding to an unexposed film F which is actually exposed. The control means 111 reads the exposure latent image data E, stored in the memory means 110 and displays the entire or a part of the exposure latent image data E corresponding to an unexposed film F, which is actually exposed on the liquid crystal display unit 142 for a specified period as shown in FIG. 6.

After the actually exposed contents are displayed for a specified period, the memory means 110 stores the entire or a part of the exposure latent image data E corresponding to the next unexposed film F which is actually exposed by the control means ill in the same way, the control means 111 reads the stored exposure latent image data E, and the liquid crystal display unit 142 displays the entire or a part of the exposure latent image data E corresponding to an unexposed film F, which is actually exposed, for a specified period as shown in FIG. 6. By repeating the above operation successively, the contents of the exposure latent image data E can be checked unless the films are developed.

FIGS. 7-a and 7-b show another embodiments of exposure latent image data display.

In this embodiment, as shown in FIG. 7-a, the memory means 110 stores each part of the exposure latent image data E, which is actually exposed to an unexposed film F which is fed, for example, sections N1, N2, and N3, the control means 111 reads the exposure latent image data E in each divided section successively, and the liquid crystal display unit 142 displays the exposure latent image data E which is seen as if exposed on a film as shown in FIG. 7-b. By doing this, the exposure latent image data E can be easily checked.

As described above, the present invention comprises a latent image exposure means for exposing the set exposure latent image data in synchronization with the movement of a photosensitive material, a latent image data detection means for detecting the exposure latent image data which is being exposed, a memory means for storing the detected exposure latent image data, and a control means for storing the detected exposure latent image data in the memory means and displaying the data on a means for displaying data for a specified period. Therefore, the present invention exposes exposure latent image data at the predetermined position on an unexposed film in synchronization with the movement of a photosensitive material, detects exposure latent image data which is being exposed, stores the detected exposure latent image data in a memory means, and reads and displays the exposure latent image data on a means for displaying data for a specified period. By doing this, the contents of exposure latent image data which are being exposed can be monitored in synchronization with the movement of t-.he film almost in real time unless the film is developed.

The next embodiment of the present invention will be described hereunder.

Figure 8:
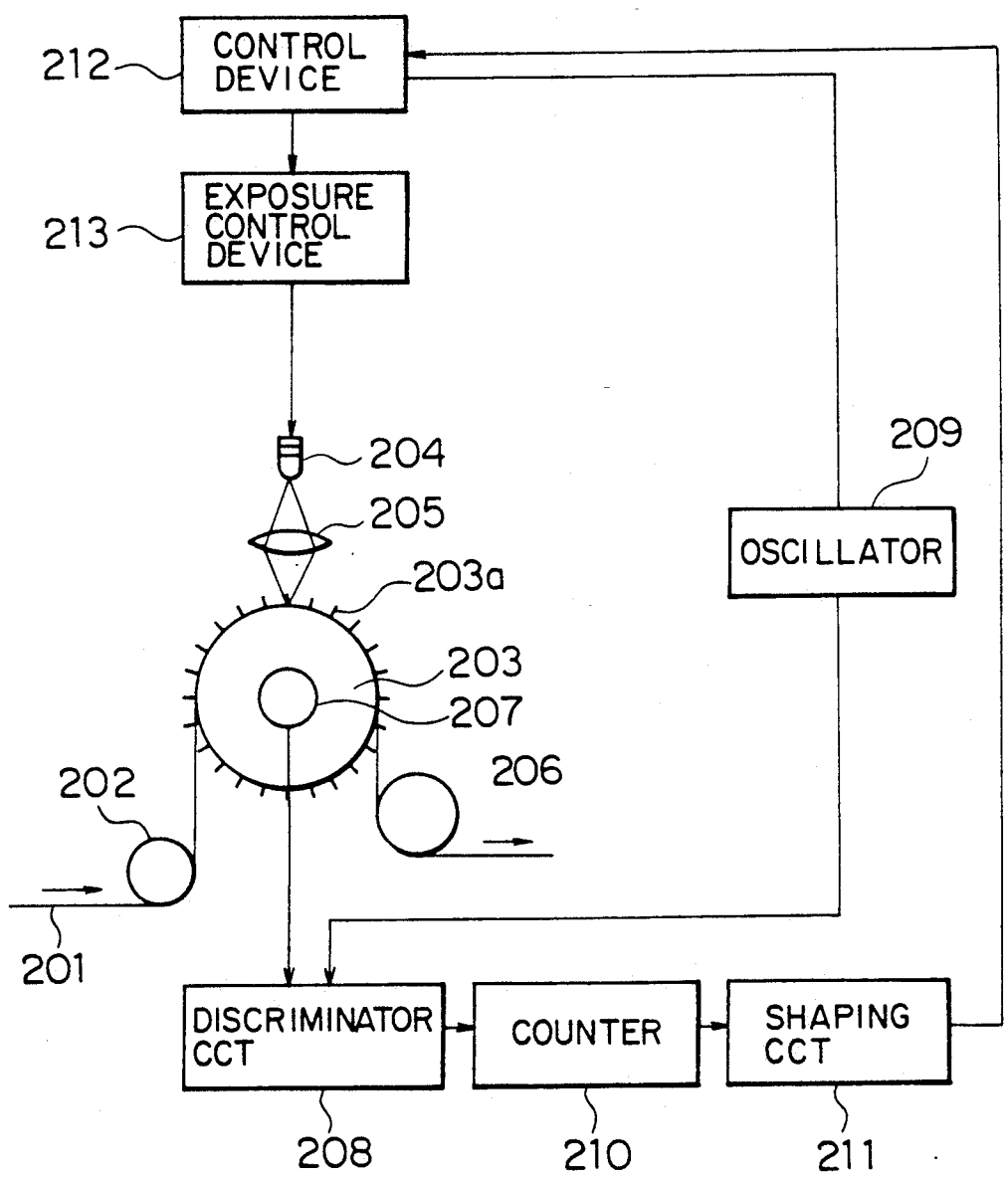
FIG. 8 is a schematic view of a film data exposure device.
Figure 9:
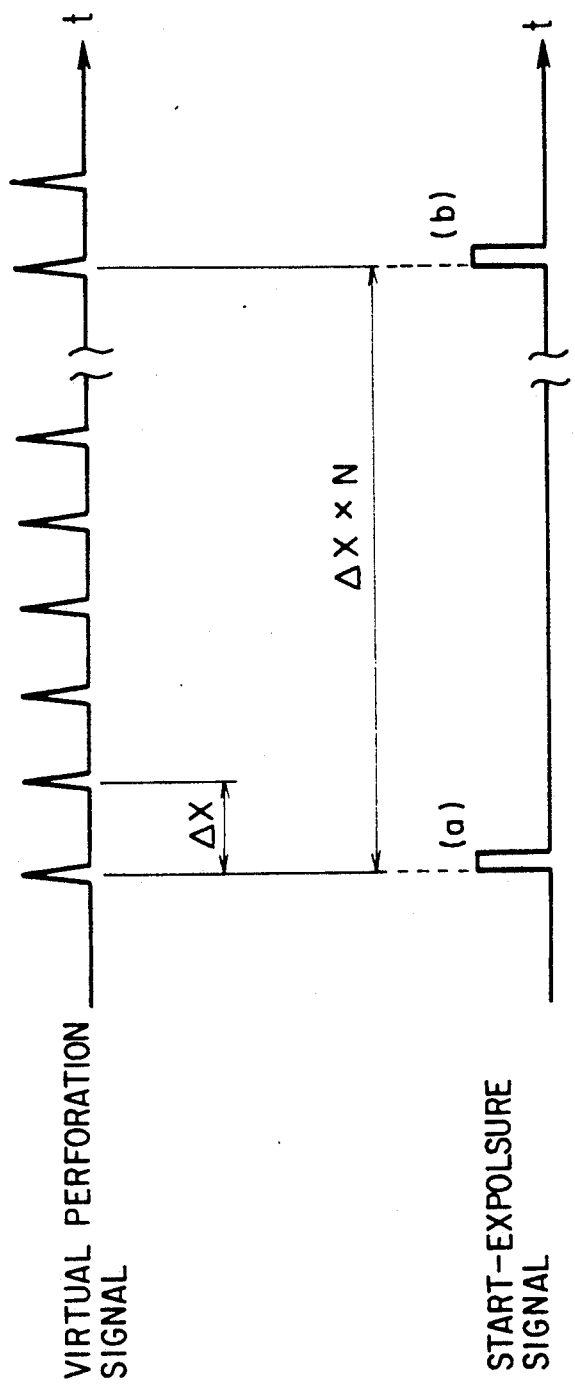
FIG. 9 is an exposure timing chart.

FIG. 8 is a schematic view of a film data exposure device and FIG. 9 is an exposure timing chart.

In FIG. 8, an unexposed film 201 is pulled out from a feed source on the left which is not shown in the drawing to a guide roller 202. A perforation of the unexposed film 201 is engaged with a tooth 203a of an exposure drum 203 and the unexposed film 201 is wound round and fed by the exposure drum 203. A predetermined latent image data is exposed to the unexposed film 201 on the exposure drum 203 via a light source 204 and a lens 205, and the film is led by a guide roller 206 and wound round a winding means on the right which is not shown in the drawing.

A rotary encoder 207 is directly connected to the rotation shaft of the exposure drum 203, rotates in synchronization with the exposure drum 203, and generates a pulse which coincides with the passing timing of each perforation of the unexposed film 201.

The pulse generated from the rotary encoder 207 is supplied to a forward movement discriminator circuit 208, which outputs a pulse indicating that the exposure drum 203 rotates in the forward direction from the current position or the exposure drum rotates in the film feed direction from the current position. The pulse indicating movement in the forward direction is synchronized with a signal supplied to the forward movement discriminator circuit 208 from an oscillator 209, and the synchronized signal is supplied to a counter 210 so as to count the number of pulses. The signal, which passes through the counter 210, is supplied to a wave form shaping circuit 211 so as to eliminate the effect of noise contained in the signal and to generate a virtual perforation signal of the unexposed film 201 as shown in FIG. 9. The virtual perforation signal is supplied to a control unit 212. The control unit 212 addresses the predetermined latent image data according to the virtual perforation signal and outputs an exposure start instruction pulse as shown in FIG. 9 in the predetermined exposure timing by inputting a film cutter signal so as to operate an exposure control unit 213. The exposure control unit 213 receives the exposure start instruction pulse and allows the light source 204 to emit light so as to expose the latent image data at the predetermined position of the unexposed film 201.

In the exposure timing chart in FIG. 9, each pulse of the virtual perforation signal generates at even intervals of $\Delta x$. The interval $\alpha x$ is equal to the perforation pitch. By counting pulses of the virtual perforation signal which are generated in such timing, the latent image data can be exposed in highly precise synchronization with the movement of the unexposed film 201.

The timing for generating an exposure start instruction pulse for the second unexposed film 201, for example, after an exposure start instruction pulse (a) for the first unexposed film 201 indicating exposure start of the latent image data is generated is determined by counting the number of pulses (N) of the virtual perforation signal between (a) and (b).

Even if the film size is changed during production, therefore, the exposure of the latent image data can be started at the predetermined position by changing the count (N).

According to a pulse outputted from the rotary encoder 207 which rotates in synchronization with the movement of the unexposed film 201 unless a sensor detects notches and perforations in this way, the latent image data is exposed at the predetermined position using the pulse as a virtual perforation signal. Therefore, the exposure light is prevented from interference with teeth of the exposure drum which are engaged with perforations of the unexposed film 201 and the latent image data is exposed properly.

Since pulses are outputted in synchronization with the movement Of the unexposed film 201 and the latent image data is exposed using each pulse as a virtual perforation signal, a facility for forming notches and a sensor for detecting them and a sensor for detecting perforations are not required and the exposure price can be reduced.

Figure 10:
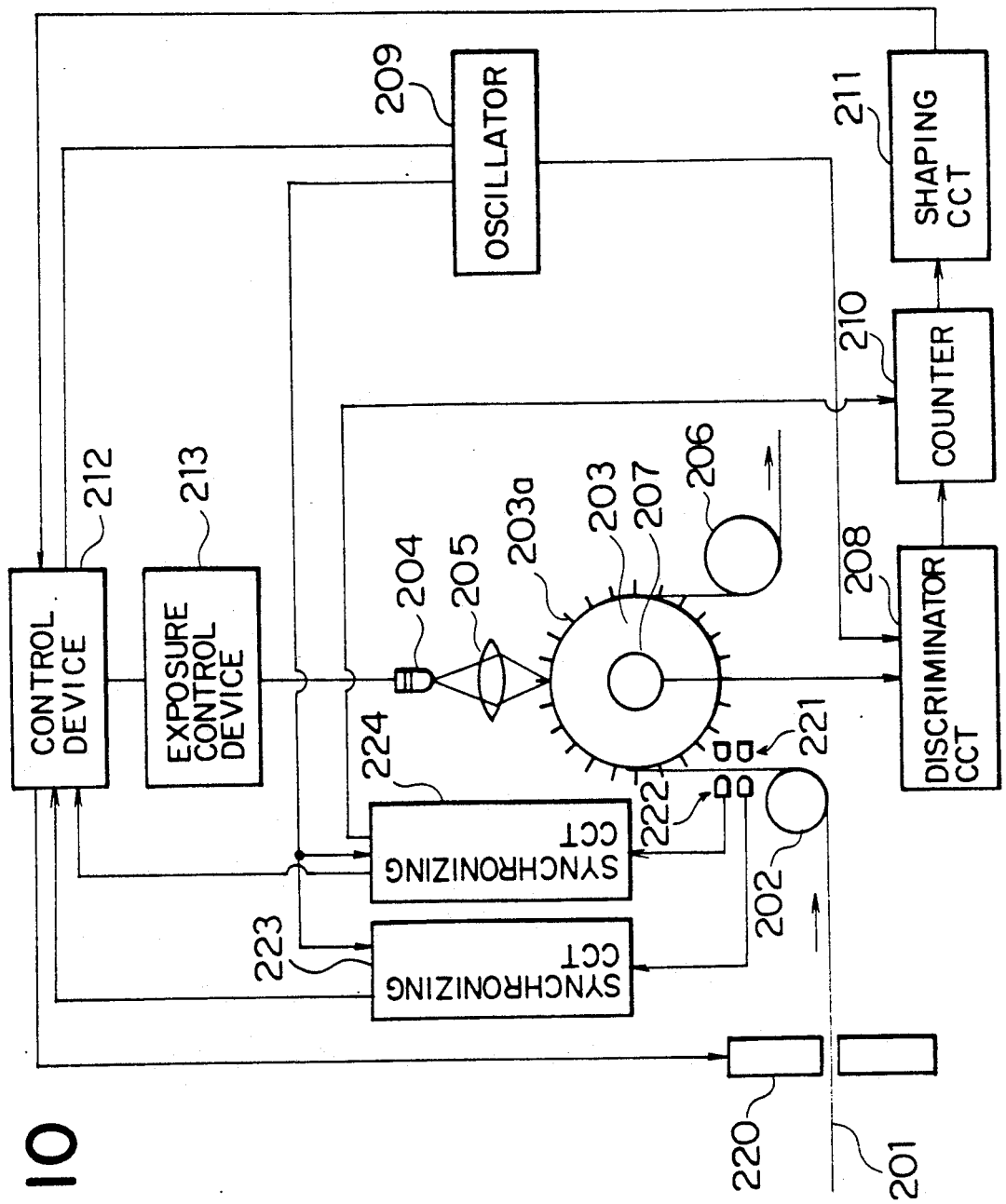
FIG. 10 is a schematic view of another embodiment of a film data exposure device of the present invention.
Figure 11:
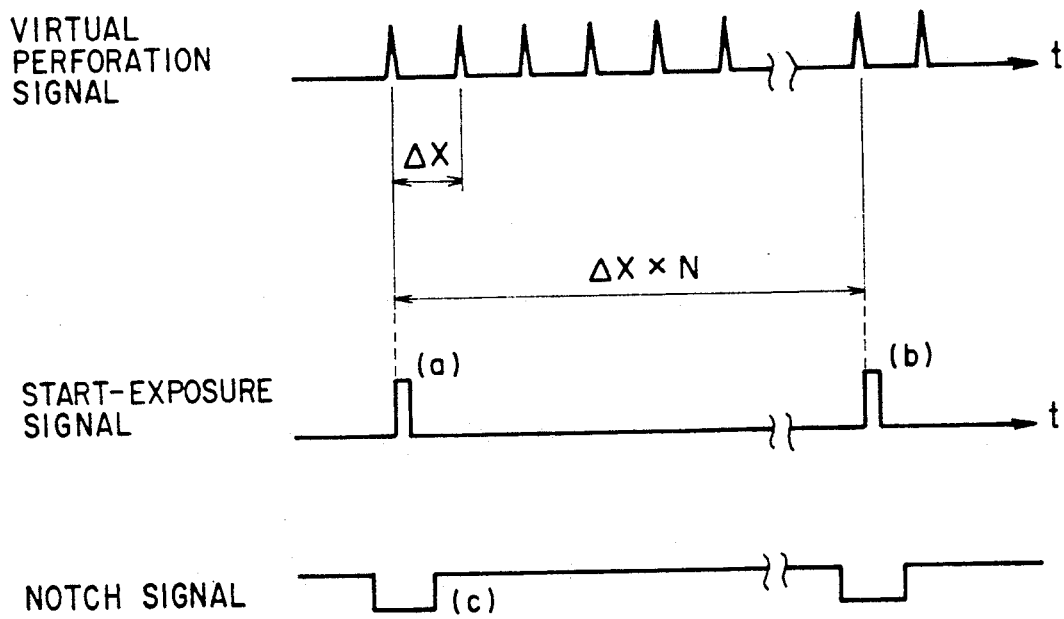
FIG. 11 is an exposure timing chart using auxiliary signals.
Figure 12:
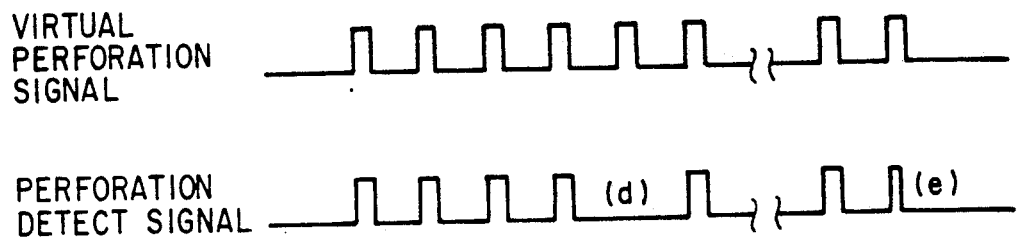
FIG. 12 is a timing chart for detecting a perforation error.

FIG. 10 is a schematic view of another embodiment of a film data exposure device of the present invention, FIG. 11 is an exposure timing chart using auxiliary signals, and FIG. 12 is a timing chart for detecting a perforation error.

In FIG. 10, a notch cutter 220 is operated by a control unit 212, and whenever an unexposed film 201 is fed in the predetermined length, a notch is formed at one side edge of the unexposed film 201.

Between a guide roller 202 and an exposure drum 203, a notch sensor 221 comprising a combination of an emission element for emitting infrared light which does not expose the unexposed film 201 and a photo detector for detecting the light and a perforation sensor 222 are installed. The notch sensor 221 detects notches formed by the notch cutter 220 and sends the notch detection signal to the control unit 212 via a synchronizing circuit 223. The perforation sensor 222 detects perforations and sends the perforation detection signal to the control unit 212 via a synchronizing circuit 224 in the same way.

In FIG. 11, the notch detection signal is used as an auxiliary signal, and a notch detection signal (C) detected by the notch sensor 221 and a signal from an oscillator 209 are synchronized with each other by the synchronizing circuit 223. The synchronized signal is sent to the control unit 212 and compared with the virtual perforation signal. When no error is found in the timing for generating the exposure start instruction pulses (a) and (b), the exposure of the latent image data is started.

As an auxiliary signal, an operation signal of a cutter for cutting the unexposed film 201 which is not shown in the drawing may be used in place of the notch detection signal.

For detecting a perforation error, a perforation detection signal detected by the perforation sensor 222 and a signal from the oscillator 209 are synchronized with each other by the synchronizing circuit 224, and the synchronized signal is sent to the control unit 212 or a counter 210 and compared with the virtual perforation signal. FIG. 12 shows a comparison example.

The virtual perforation signal shown in FIG. 12 is shaped in waveform so that it can generate pulses in the same shape as that of the perforation detection signal. By such a signal comparison, perforations (d) and (e) which are not punched normally due to a punch error can be detected immediately. By doing this, perforation errors can be detected easily and surely.

As described above, the present invention comprises a rotary encoder which rotates in synchronization with an exposure drum, the rotary encoder generates a pulse which coincides with the passing timing of each perforation of an unexposed film, and the latent image data exposure position is Set according to the pulse. Therefore, sensors for detecting notches and perforations are not required, and latent image data can be exposed using each pulse outputted by the rotary encoder which rotates in synchronization with the movement of the unexposed film as a virtual perforation signal.

By doing this, variations in the exposure position of an unexposed film during feed are minimized, the exposure light is prevented from interference with teeth of an exposure drum which are engaged with perforations of the unexposed film, and latent image data is exposed properly.

Since pulses are outputted in synchronization with the movement of the unexposed film and the latent image data is exposed using each pulse as a virtual perforation signal, a facility for forming notches and a sensor for detecting them and a sensor for detecting perforations are not required and the exposure price can be reduced. By applying the virtual perforation signal, a punch error can be detected surely.

The next embodiment of the present invention will be described in detail hereunder with reference to the accompanying drawings.

FIG. 13 is a side view showing the configuration of an exposure unit of a latent image exposure device of a constant size film processing machine.

The constant size film processing machine body is a darkroom, and a long size unexposed film F pulled out from a source winding magazine, which is not shown in the drawing, is wound round a rotary notcher 302 via guide rollers 301. The rotary notcher 302 is operated under the control of a control unit ever the 303, and a notch is formed at one side edge of the unexposed film F whenever the unexposed film F is fed by the predetermined number of frames.

Next, the unexposed film F with notches formed is wound round a flywheel 304 via the guide rollers 301. The periphery of the flywheel 304 is made of rubber, a rubber nip roller 305 is installed opposite to the periphery of the flywheel 304. The nip roller 305 is fixed to one end of an arm 306. The other end of the arm 306 is connected to a pin 307 which can freely rotate and pulled by the elasticity of a spring 308 so as to press the nip roller 305 against the flywheel 304 and to apply the predetermined pressure to the unexposed film F.

A notch sensor 321 and a perforation sensor 322 are installed between the rotary notcher 302 and the flywheel 304, detect notches and perforations, and send detection signals to a control unit 303.

The unexposed film F fed from the flywheel 304 is fed to an exposure drum 310 with sprocket teeth 309 which are engaged with perforations. The outer diameter or the peripheral length of the exposure drum 310 is designed so that the contact length between the unexposed film F and the exposure drum 310 when the film is wound round the drum at the predetermined winding angle is shorter than the theoretical contact length by 0.2 to 0.35 mm. A rotary encoder 312 is directly connected to one end of a rotation shaft 311 of the exposure drum 310, outputs a pulse in accordance with the feed rate of the unexposed film F, and sends it to the control unit 303. The control unit 303 detects the position of the unexposed film F according to the notch and perforation detection signals and the counted pulse value. The latent image data, which is stored in the control unit 303 beforehand, is read according to the detected position, and one of the light source LEDs installed in the control unit 303 is selectively turned on. The light of the light source LED is led to a light emitter 313 via an optical fiber and forms the predetermined latent image data on the unexposed film F on the exposure drum 310. Different images are formed successively as the unexposed film F moves, and the latent image data stored in the control unit 303 is reproduced on the unexposed film F.

Figure 14:
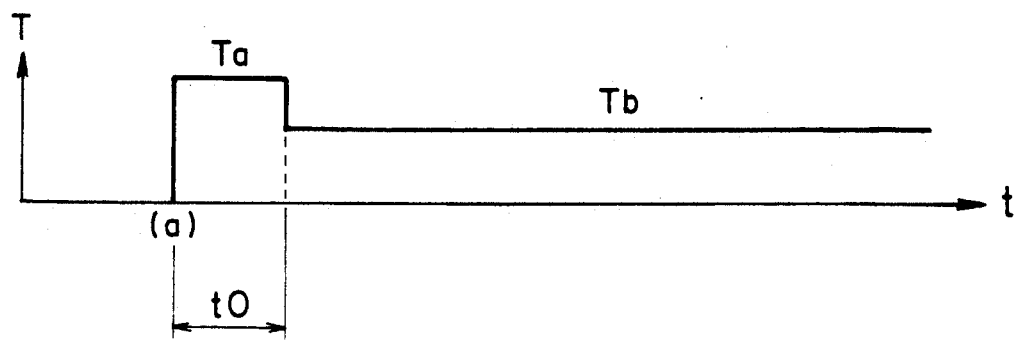
FIG. 14 is a torque time chart of a torque motor.

A torque motor 314 is directly connected to the other end of the rotation shaft 311 of the exposure drum 310 and applies the rotation force to the exposure drum 310 in the film feed direction. FIG. 14 shows a torque time chart of the torque motor 314. In FIG. 14, the torque motor 314 drives the unexposed film F to (a) after it is loaded, applies the predetermined torque (T=Ta) to the exposure drum 310 for a specified period (t=tO), and presses the sprocket tooth 309 of the exposure drum 310 to the front edge of the corresponding perforation of the unexposed film F in the feed direction against the frictional force generated between the unexposed film F and the exposure drum 310. Thereafter, the torque motor reduces the torque to the predetermined value (T=Tb) and continues the feed of the unexposed film F. By doing this, even if the feed of the unexposed film F is halted, a stable forward tension is applied to the unexposed film F. Since the sprocket tooth 309 is pressed to the front edge of the perforation so as to feed the film, when a feed variation occurs so that the exposure drum 310 rotates reversely, no relative shift occurs between the unexposed film F and the exposure drum 310.

The unexposed film F, whereto the latent image is exposed by the exposure drum 310, is fed to a constant size sprocket 316 for feeding the unexposed film F in the predetermined length via a dancer roller 315 for absorbing the speed difference, and then cut by a constant size cutter which is not shown in the drawing.

Next, the relationship between the exposure drum 310 and the frictional force with the unexposed film F which is wound round the exposure drum 310 will be described according to the principle diagram shown in FIG. 15.

Figure 15:
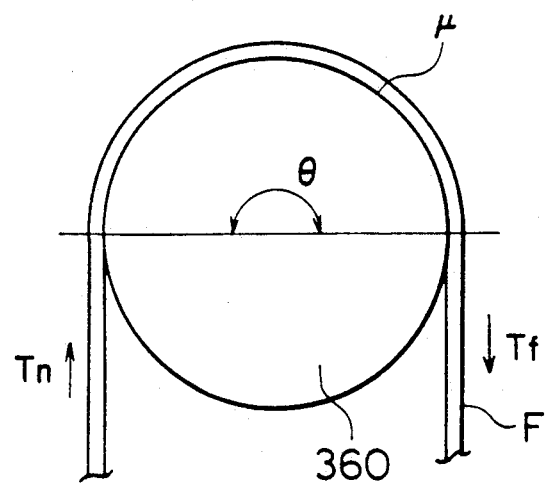
FIG. 15 is a principle diagram for explaining the relationship between a drum and the frictional force with an unexposed film which is wound round the drum.
Figure 14:
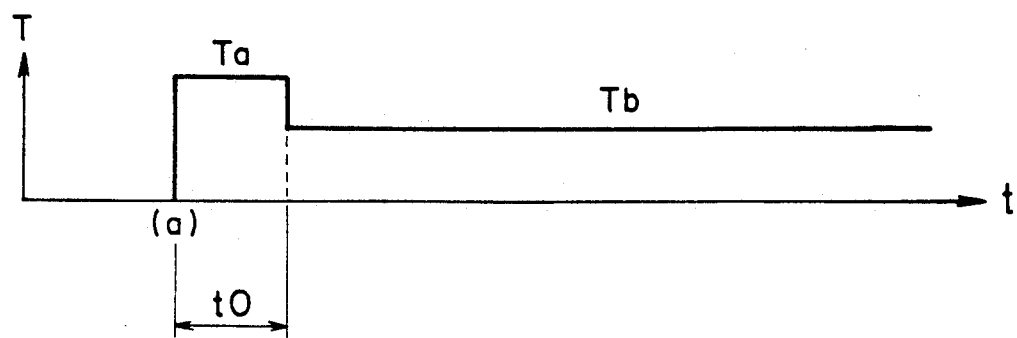
Figure 15:
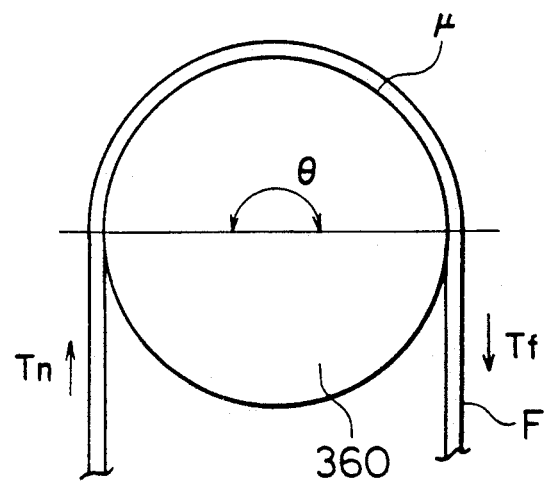

Assuming that a tensile strength of T=Tn is applied to an unexposed film F, which is wound round a general drum 360 at a coefficient of friction of $\mu$ and a winding angle of $\theta$, on the descending side in the feed direction and a tensile strength of T=Tf is applied on the ascending side in the principle diagram shown in FIG. 15, the unexposed film F does not slide on the drum 360 when the tensile strengths satisfy the following relative equation:

$$\text{Tn exp}(\mu\theta) < \text{Tf} < \text{Tn}/\exp(\mu\theta) \tag{I}$$

The equation shows that when one of the tensile strengths becomes 0, the unexposed film F always starts sliding. Therefore, the tensile strengths are required to be stable within the predetermined limits. Particularly in a constant size film processing machine, a rotary notcher 302 for forming notches is installed on the ascending side of the exposure drum 310, and feed variations are easily generated. A flywheel 304 is installed on the ascending side of the exposure drum 310 as a mechanism for stabling the tensile strengths.

Next, the relationship between the flywheel 304 and the frictional force with the unexposed film F which is wound round the flywheel 304 will be described with reference to FIG. 16.

Figure 16:
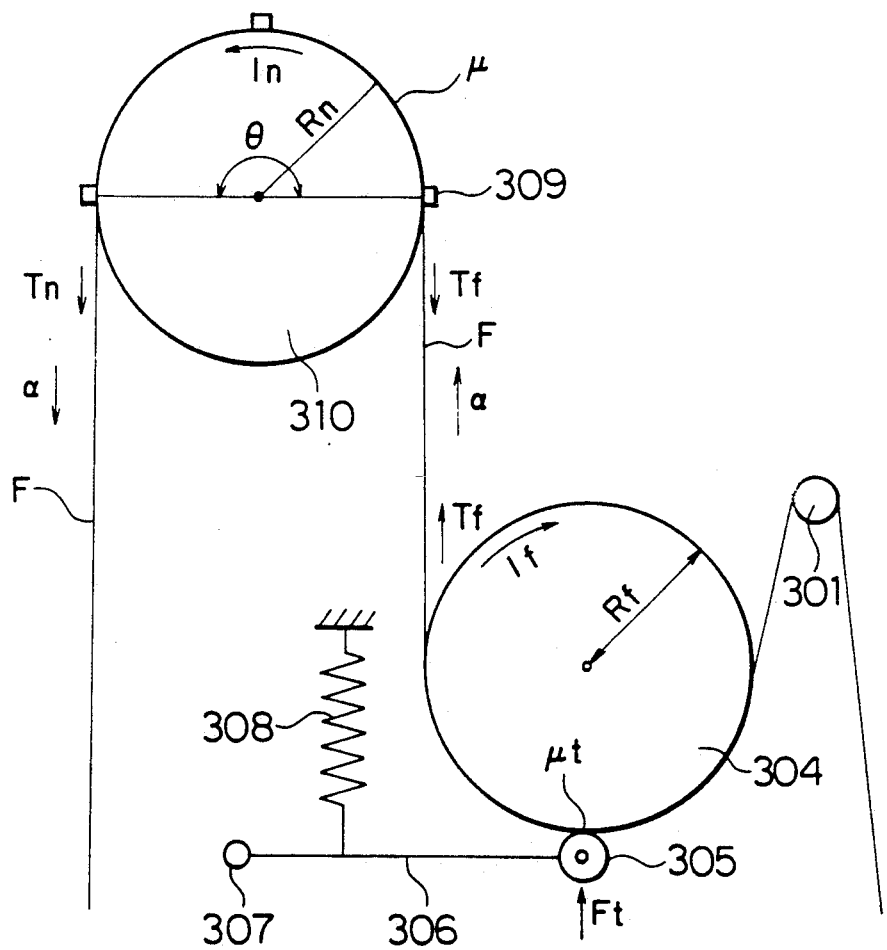
FIG. 16 is a side view of a flywheel of a constant size film processing machine and an exposure drum for explaining the relationship between the flywheel and the frictional force with an unexposed film which is wound round the flywheel.

In FIG. 16, it is assumed that the radius of the flywheel 304 is Rf and the tensile strength T of the unexposed film F on the ascending side of the flywheel 304 is 0 and the tensile strength T on the descending side is Tf, and furthermore, the moment of inertial by the rotation of the flywheel 304 is If. When a load with an acceleration of $\alpha$ is applied to the unexposed film F in the feed direction, the following equation is held for the flywheel 304.

$$\text{Tf} \cdot \text{Rf} = \text{If} \cdot \alpha / \text{Rf} \tag{II}$$

It is assumed furthermore that the radius of the exposure drum 310 is Rn, the coefficient of friction between the exposure drum 310 and the unexposed film F is $\mu$, the moment of inertia of the exposure drum 310 is In, the winding angle of the unexposed film F is $\theta$, and a load with an acceleration of $\alpha$ is applied to the unexposed film F in the feed direction. Assuming that the tensile strength of the unexposed film F on the ascending side of the exposure drum 310 is Tf, which is described above, and the tensile strength on the descending side is Tn, the following equation is held for the exposure drum 310.

$$(\text{Tn} - \text{Tf}) \cdot \text{Rn} = \text{In} \cdot \alpha / \text{Rn} \tag{III}$$

The condition under which the unexposed film F does not slide on the exposure drum 310 is as follows:

$$\text{Tn}/\text{Tf} < \exp(\mu\theta) \tag{IV}$$

The acceleration $\alpha$ is eliminated from the above equations (II), (III), and (IV), and the following equation is held.

$$\frac{Rf^2 \cdot In}{If \cdot Rn^2} < \exp(\mu\theta) - 1 \tag{V}$$

When Rn=Rf, $\mu$=0.24 (measured value for the exposure drum), and $\theta = \pi$ are used in the above equation, the following equation is held.

$$\text{In}/\text{If} < 1.13 \tag{VI}$$

So as to prevent the unexposed film F from sliding on the exposure drum 310,, it is required that the moment of inertia If of the flywheel 304 satisfies the equation (VI) for the moment of inertia In of the exposure drum 310. When the moment of inertial If of the flywheel 304 is relatively high, the tension of the unexposed film F increases during acceleration and a kick is easily given to the edge of the corresponding perforation by the sprocket tooth 309. Therefore, the moment of inertial IfO obtained from the equation indicated below is assumed as a lower limit. Table 1 shows virtual experimental result for obtaining an upper limit of Ifmax of the moment of inertial for the lower limit IfO.

$$\text{In}/\text{IfO} = 1.13 \tag{VII}$$

TABLE 1

| Film sensitivity | Magnification of moment of inertia when a fault occurs, n = Ifmax / If0 | Fault contents |
| --- | --- | --- |
| ISO 100 | 3.1 | Dot shift |
| ISO 200 | 3.0 | Dot shift |
| ISO 400 | 2.4 | Kick |
| ISO 3200 | 2.2 | Kick |

The film type used in the experiment is Color Negafilm (manufactured by Konica, Ltd.).

The above experimental result shows that the upper limit Ifmax of the moment of inertia If of the flywheel 304 is about 3 times of the lower limit IfO. Therefore, it is required that the moment of inertia If of the flywheel 304 is within the limits of IfO<If<3IfO.

As mentioned above, so as to prevent the unexposed film F from sliding on the flywheel 304, the nip roller 305 presses the unexposed film F against the periphery of the flywheel 304.

Considering that when the pressure at the contact surface is excessively high, a fault may occur in the unexposed film F, the pressure Ft of the nip roller 305 is controlled to 1 gkf.

When the frictional force by the pressure is extremely low, the unexposed film F slides on the periphery of the flywheel 304, causing damage to the unexposed film F. Therefore, the condition under which the unexposed film F and the flywheel 304 do not slide mutually is as follows: The force for generating an acceleration, which is equal to the acceleration $\alpha$ generated during feed of the unexposed film F, in the flywheel 304 is smaller than the maximum frictional force between the unexposed film F and the flywheel 304.

Assuming that the pressure of the nip roller 305 is Ft and the coefficient of friction generated between the flywheel 304 and the unexposed film F is $\mu t$, no sliding occurs when the following equation is held.

$$\mu t \cdot Ft \cdot Rf > If \cdot \alpha / Rf \quad \text{(VIII)}$$

The following equation can be obtained from the equations (VIII) and (V)

$$\alpha < \mu t \cdot Ft \frac{Rn^2}{In} / ln\{\exp(\mu\theta) - 1\} \quad \text{(IX)}$$

The values indicated below are used in the equation (IX), and calculations are performed.

Acceleration of gravity g=9.80 [m/sec$^2$]

Moment of inertial of exposure drum system In=0.134 ×10$^{-3}$[kgm$^2$]

The moment of inertia In of the exposure drum 310 includes the exposure drum 310, torque motor 314, rotary encoder 312, rotation shaft 311, and coupling, and is obtained from measured and calculated values. Radius of exposure drum 310 (36T drum)

$$Rn = 27.2 \times 10^{-3} \text{ [m]}$$

Coefficient of friction between exposure drum 310 and unexposed film F $$\mu = 0.24 \text{ (measured value)}$$

Winding angle of unexposed film F against exposure drum 310

$$\theta = \pi$$

Pressure of nip roller 305

$$Ft = 9.8 \text{ [N]} = 1.0 \text{ [kgf]}$$

Coefficient of friction between nip roller 305 and unexposed film F $$\mu t = 0.50 \text{ (\%measured value)}$$

Characteristics of the flywheel 304 can be obtained from the above values. Assuming that the radius of the flywheel 304 is $Rn = Rf = 27.2 \times 10^{-3}$[m], the lower limit of the moment of inertial of the flywheel 304 is IfO $= 0.119 \times 10^{-3}$ [kgm$^2$] from the equation (VII).

When the value for Rf$^2$/IfO is the same as that obtained from the above values, the values for Rf and IfO may be another optional values.

The maximum acceleration of an unexposed film F wherein no scratch is caused at the nip roller 305, which is calculated from the equation (IX), is $\alpha = 30.4$ [m/sec$^2$]. From the equations (II) and (III), the tension applied to the unexposed film F on the ascending side of the exposure drum 311 in this case is Tf=4.90 [N]0.5 [kgf], and the tension on the descending side is Tn= 10.41 [N] = 1.065 [kgf].

Figure 17:
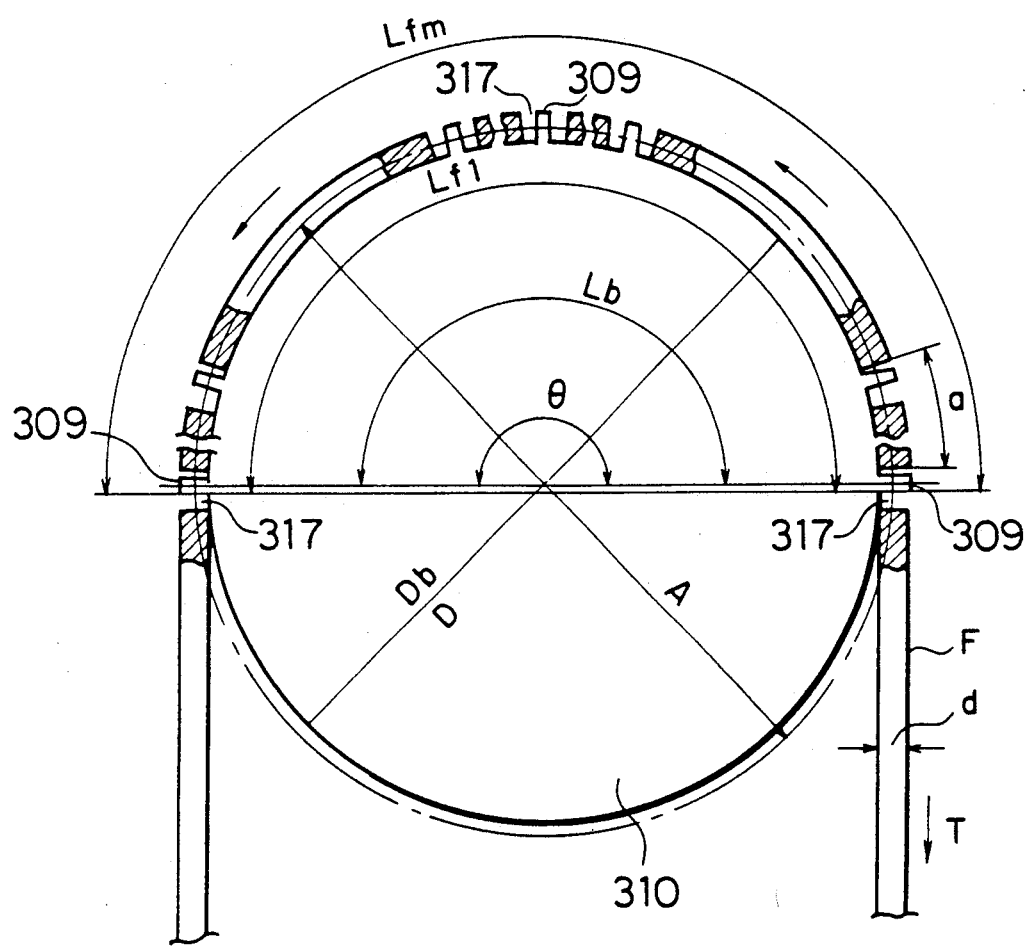
FIGS. 17 and 18 are side views for explaining the operation of an unexposed film on an exposure drum of a latent image exposure device of a constant size film processing machine.

Next, the operation of the unexposed film F on the exposure drum 310 will be described in detail with reference to FIG. 17.

The unexposed film F is wound round the exposure drum 310 with each perforation engaged with the sprocket tooth 309, and rotates so that the unexposed film F does not slide on the exposure drum 310. Assuming that the contact angle between the exposure drum 310 and the unexposed film F is $\theta = \pi$ and a tensile strength of Tn=Tf=1.0 [kgf] is applied to the unexposed film F on the ascending and descending sides of the exposure drum 310, the tensile strength per area of the unexposed film F is T=0.260 [kgf/mm$^2$]. The theoretically calculated value of the outer diameter D of the exposure drum 310 is as follows:

Film thickness d = 0.14 mm
Perforation pitch a = 4.75 mm
No. of sprocket teeth p = 36
Modulus of elasticity of film E = 400 [kgf/mm$^2$]

Assuming that the diameter of the half circle at the center of the film thickness d is A, the peripheral length Lfm of the half circle is as follows:

$$A = D + d$$

$$2Lfm = A\pi = 4.75\, p\, (1 + T/E)$$

Therefore:

$$D = \frac{4.75}{\pi} \cdot p \left(1 + \frac{T}{E}\right) - d$$

When the corresponding values are used in the above equation, the theoretical outer diameter of the exposure drum 310 is as follows:

$$D = 54.33 \text{ mm}$$

The most suitable value obtained from the experiment is as follows:

$$Db = 54.15 \pm 0.05 \text{ mm}$$

Assuming that the contact angle between the exposure drum 310 with the most suitable outer diameter and the unexposed film F is $\theta = \pi$, the peripheral length difference $\Delta = Lb - Lfl$ between the actual contact length Lb and the theoretically calculated contact length Lfl of the half circle of the unexposed film F ranges from $-0.20$ mm to $-0.36$ mm.

Figure 18:
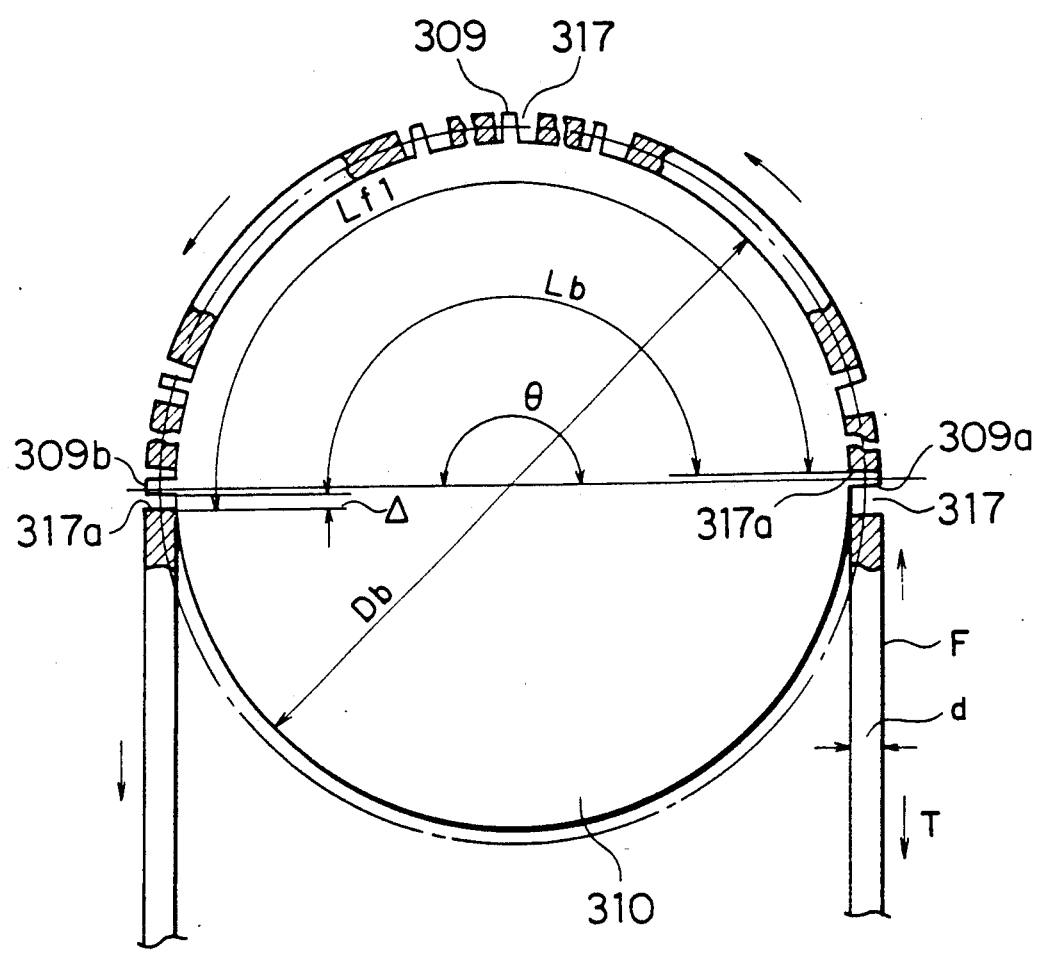

When the unexposed film F engaging with the sprocket tooth 309 of the exposure drum 310 with such an outer diameter is fed, the feed rate of the sprocket tooth 309 is higher than that of the unexposed film F from the relationship of Lb<Lfl, and the sprocket tooth 309a on the feed-in side of the exposure drum 310, finally as shown in FIG. 18, is pressed to the front edge 317a of the perforation 317 in the feed direction for feeding the unexposed film F. For the sprocket tooth 309b on the feed-out side of the exposure drum 310, a gap of Δ=0.20 mm to 0.36 mm is provided from the front edge 317a of the perforation 317.

When the outer diameter of the exposure drum 310 is extremely smaller than the most suitable drum outer diameter Db, the sprocket tooth 309a on the feed-in side does not coincide with the perforation 317 of the unexposed film F and rides on the perforation, and the feed becomes impossible. When the outer diameter of the exposure drum 310 is larger than Db, the outer diameter becomes close to the theoretical value and it is impossible to press the unexposed film F stably on one side. When the tension applied to the unexposed film F is changed, a relative shift occurs between the perforation 317 and the sprocket tooth 309a.

Figure 19:
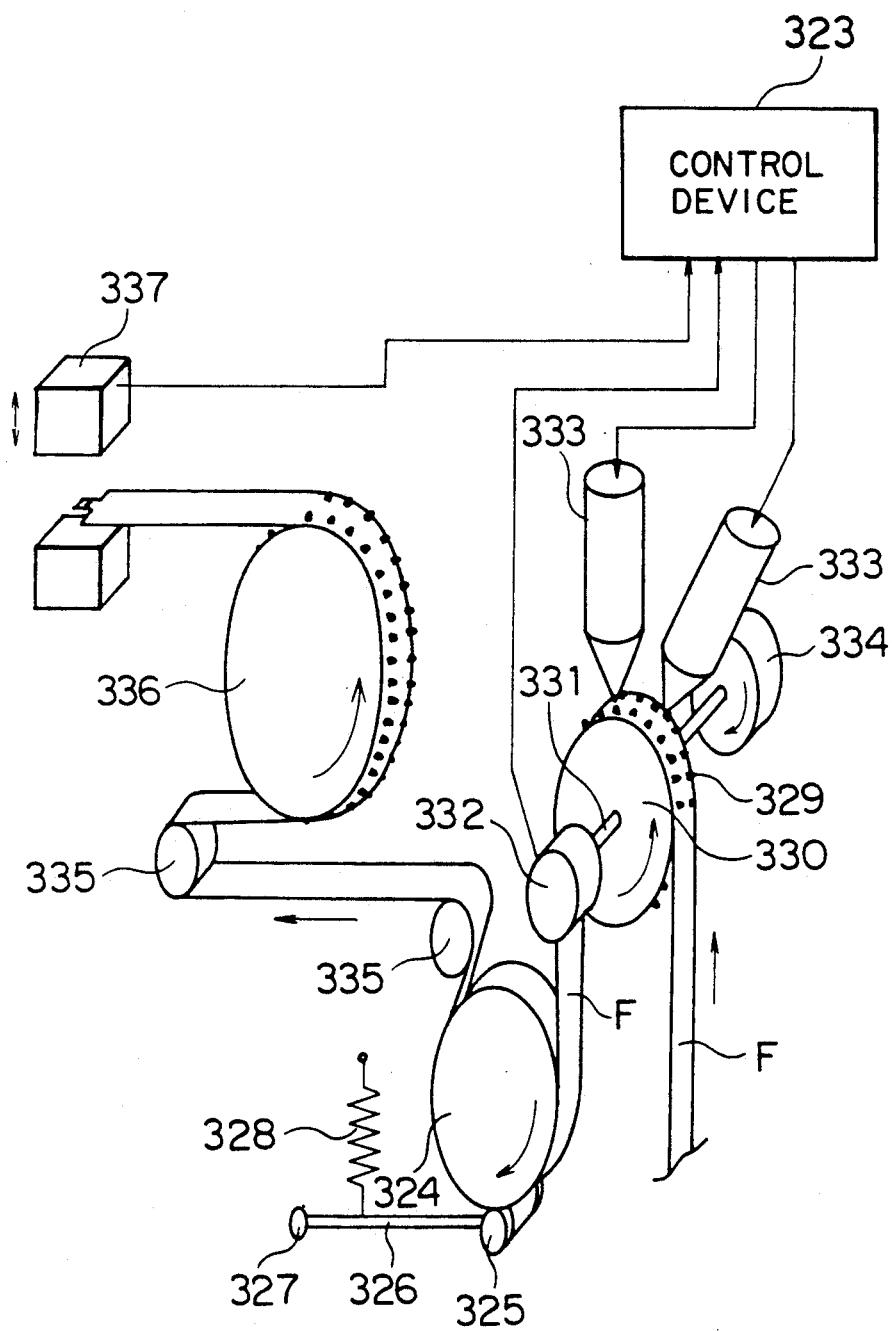
FIG. 19 is a perspective view showing the configuration of an exposure unit of a latent image exposure device of a free size film processing machine wherein the feed distance between the exposure drum and a constant size sprocket is short.

Next, another embodiment will be described with reference to FIG. 19. FIG. 19 is a perspective view showing the configuration of an exposure unit of a latent image exposure device of a free size film processing machine wherein the feed distance between an exposure drum, which is a latent image exposure unit, and a constant size sprocket, which is a film cutting unit, is short.

In a free size film processing machine, unlike a constant size film processing machine, it is impossible to form notches for indicating the constant size position for all the sizes, and the control for starting latent image exposure when a notch is detected is impossible. Therefore, a free size film processing machine is configured so that a latent image is exposed immediately prior to a constant size sprocket for determining the cutting position. In this free size film processing machine, an unexposed film F is pulled out from a source winding magazine which is not shown in the drawing and fed to an exposure drum 330 with a sprocket tooth 329 which is engaged with the corresponding perforation via a dancer roller which is not shown in the drawing. The outer diameter or the peripheral length of the exposure drum 330 is designed so that the contact length between the unexposed film F and the exposure drum 330 when the film is wound round the drum at the predetermined winding angle is longer than the theoretical contact length by 0.2 to 0.35 mm. A rotary encoder 332 is directly connected to one end of a rotation shaft 331 of the exposure drum 330, outputs a pulse in accordance with the feed rate of the unexposed film F, and sends it to the control unit 323. The control unit 323 counts the pulse according to an operation signal of a constant size cutter 337, detects the position of the unexposed film F according to the counted value, reads the latent image data which is stored in the control unit 323 beforehand, and allows one of the light source LEDs to light selectively. The light of the light source LED is led to a light emitter 333 via an optical fiber and forms the predetermined latent image data on the unexposed film F on the exposure drum 330.

A torque motor 334 is directly connected to the other end of the rotation shaft 331 of the exposure drum 330 and applies the rotation force to the exposure drum 330 in the reverse direction to the film feed direction. The torque time chart (of the torque motor 334 is the same as that shown in FIG. 14.) The torque motor 314 drives after the unexposed film F is loaded, applies the predetermined torque to the exposure drum 330 for a specified period, and presses the sprocket tooth 329 of the exposure drum 330 to the back edge of the corresponding perforation of the unexposed film F in the reverse direction to the feed direction against the frictional force generated between the unexposed film F and the exposure drum 330. Thereafter, the torque motor reduces the torque to the predetermined value and continues the feed of the unexposed film F. By doing this, even if the feed of the unexposed film F is halted, a stable forward tension is applied to the unexposed film F. Since the sprocket tooth 329 is pressed to the back edge of the perforation so as to feed the film, when a feed variation occurs in the direction wherein the exposure drum 330 is suddenly accelerated, no relative shift occurs between the unexposed film F and the exposure drum 330 so long as no fault occurs in the unexposed film F. When a sudden deceleration occurs, the maximum deceleration which the torque can follow is as follows.

Assuming that the torque of the torque motor 334 is:

$$To = 80.0 \times 10^{-3} \text{ [Nm]} = 0.3 \text{[kgf]}$$
(converted to tesile strength of the unexposed film F)

and the moment of inertia of the exposure drum 330 is:

$$I = 0.0825 \times 10^{-3} \text{ [kgm}^2\text{]} \text{ (measured value)}$$

and the angular speed is $\omega$[rad/sec], the angular acceleration is $d\omega/dt = 970$ [rad/sec$^2$] since $To = I \cdot d\omega/dt$. When the angular acceleration is converted to a feed acceleration of the unexposed film F using the number of teeth of the exposure drum 336, $dv/dt = a = 26.4$ [m/sec$^2$].

When the torque is the value shown above, the sprocket tooth 329 can be pressed to the back edge of the perforation for feed when the deceleration $\alpha$ is below 26.4 [m/sec$^2$]. When the deceleration is more than the value, the torque cannot follow such a sudden deceleration. The absolute value of this acceleration indicates the sudden acceleration limit which the torque applying the forward tension to the unexposed film in the above constant size film processing machine can follow.

The unexposed film F, whereto the latent image is exposed by the exposure drum 330, is wound round the flywheel 324. The periphery of the flywheel 324 is made of rubber, a rubber nip roller 325 is installed opposite to the periphery of the flywheel 324. The nip roller 325 is fixed to one end of an arm 326. The other end of the arm 326 is connected to a pin 327 which can freely rotate and pulled by the elasticity cf a spring 328 so as to press the nip roller 325 against the flywheel 324 and to apply the predetermined pressure to the unexposed film F.

Figure 20:
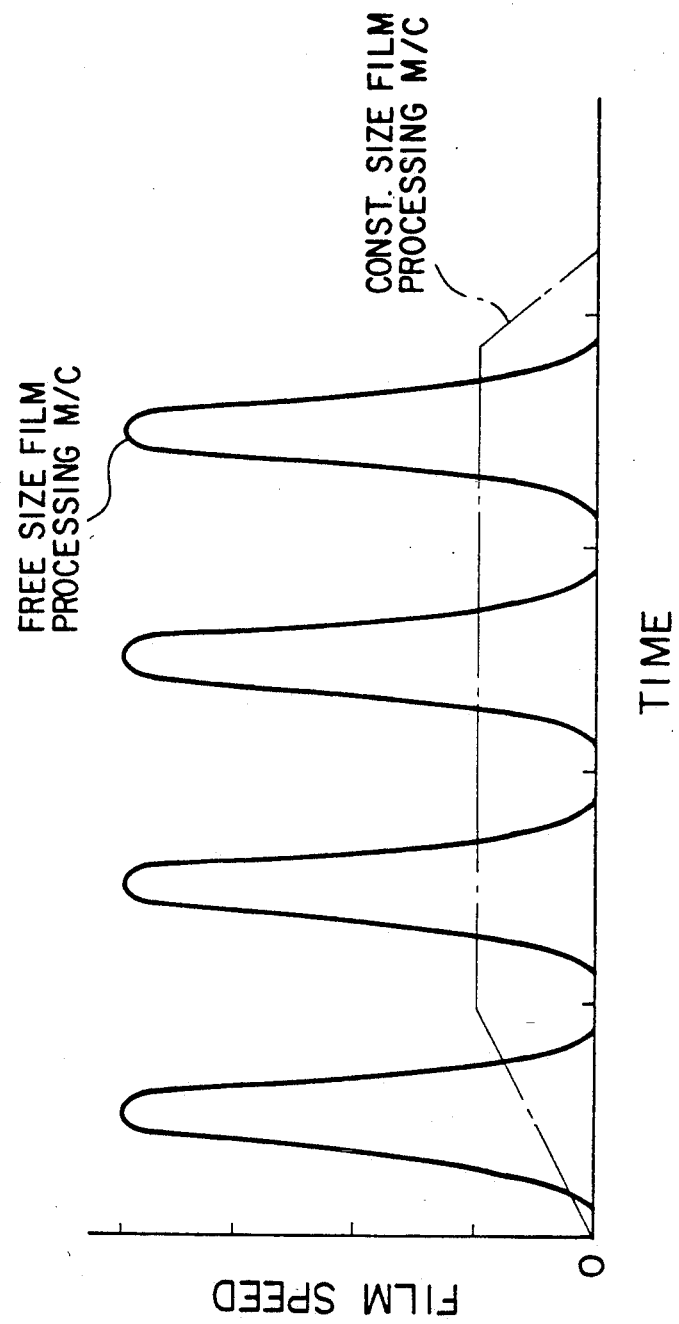
FIG. 20 is a time chart for the film feed rate of an exposure drum of a free size film processing machine.

The unexposed film F, which is fed from the flywheel 324, is fed to a constant size sprocket 336 for feeding the unexposed film F in the predetermined size via guide rollers 335 and cut by a constant size cutter 337. Since the constant size sprocket 336 feeds the unexposed film F intermittently, an acceleration for suddenly accelerating the feed rate is generated in the unexposed film F. Therefore, the film feed rate of the exposure drum 330 mounted prior to the constant size sprocket 336 is changed suddenly. FIG. 20 is a time chart for the film feed rate of the exposure drum 330.

Although the film feed rate of a conventional constant size film processing machine, which is shown by an alternate long and short dash line in FIG. 20, is almost constant and low, the film feed rate of the free size film processing machine, which is shown by a solid line, is greatly accelerated or decelerated and high. Therefore, the time required for an unexposed film F to pass through a light emitter 333 of the exposure 330 is extremely short and a more accurate film position sensor is required. When the unexposed film F is slackened between the exposure drum 330 and the constant size sprocket 336 due to intermittent feed, the unexposed film F may slide on the exposure drum 330 particularly when a sudden deceleration such as $\alpha = 26.4$ [m/sec$^2$] or less is applied to the unexposed film F, and the film position cannot be detected accurately. So as to prevent such sliding, the tension of the unexposed film F wound round the exposure drum 330 is required to be stabilized within the predetermined limits in the same way as the above constant size film processing machine. The flywheel 324 is installed on the descending side of the exposure drum 310 as a mechanism for stabilizing the tension.

Next, the relationship between the flywheel 324 and the frictional force with the unexposed film F which is wound round the flywheel 324 will be described in detail with reference to FIG. 21.

The following relational expression can be obtained in this free size film processing machine in the same way as in the above constant size film processing machine. Assuming that the radius of the flywheel 324 is Rf, the tension of the unexposed film F is $T=0$ on the descending side of the flywheel 324 and $T=Tf$ on the ascending side, the moment of inertia of the flywheel 324 by rotation is If, and an acceleration of $\alpha$ is applied to the unexposed film F during deceleration, the following equation is held for the flywheel 324.

$$Tf \cdot Rf = If \cdot \alpha / Rf \tag{II'}$$

Assuming that the radius of the exposure drum 330 is Rn, the coefficient of friction generated between the exposure drum 330 and the unexposed film F is $\mu$, the moment of inertia of the exposure drum 330 is In, the winding angle of the unexposed film F is $\mu$, the tension on the ascending side of the exposure drum 330 is $T=Tn$, and a load of an acceleration of $\alpha$ is applied to the unexposed film F during deceleration, the following equation is held for the exposure drum 310.

$$(Tn - Tf) \cdot Rn = In \cdot \alpha / Rn \tag{III'}$$

The condition under which the unexposed film F does not slide on the exposure drum 330 is as follows:

$$Tn / Tf < \exp(\mu\theta) \tag{IV'}$$

The acceleration $\alpha$ is eliminated from the above equations (II'), (III'), and (IV') and the following equation is held.

$$\frac{Rf^2 \cdot In}{If \cdot Rn^2} < \exp(\mu\theta) - 1 \tag{V'}$$

When $Rn = Rf$, $\mu = 0.24$ (measured value for the exposure drum), and $\theta = \pi$ are used in the above equation, the following equation is held.

$$In / If < 1.13 \tag{VI'}$$

Figure 21:
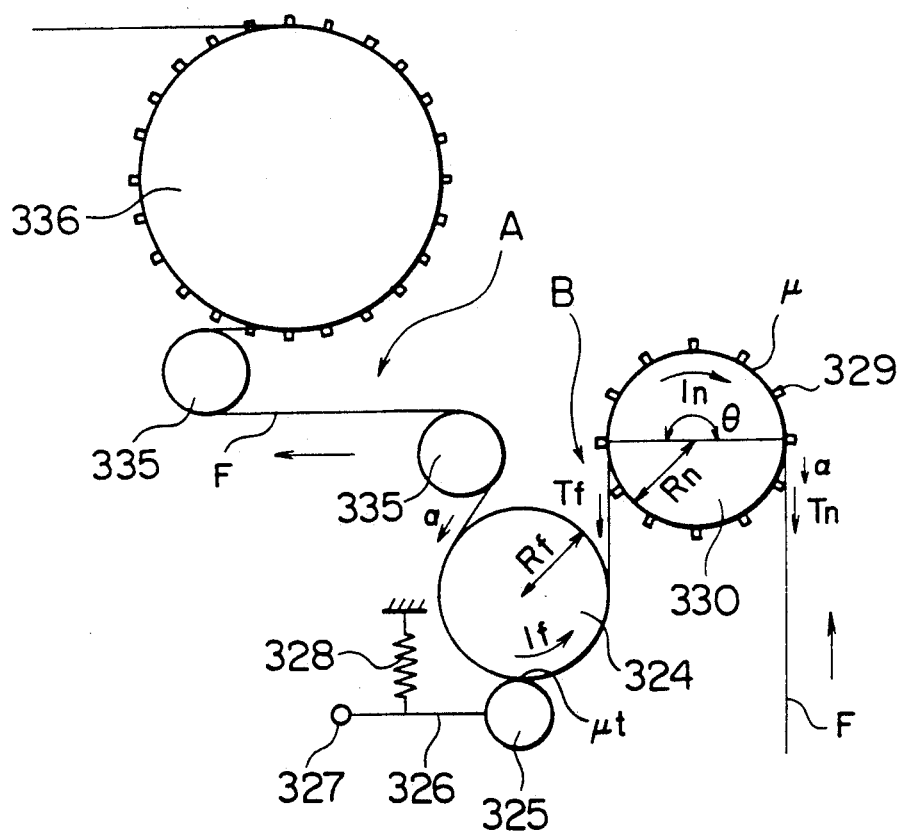
FIG. 21 is a side view of an exposure unit for explaining the relationship between a flywheel of a free size film processing machine and the frictional force with an unexposed film which is wound round the flywheel.

This means that the condition under which when the section A between the flywheel 324 and the constant size sprocket 336 is slackened by an acceleration of $\alpha$ during deceleration in FIG. 21, the section B between the exposure drum 330 and the flywheel 324 is not slackened is that the moment of inertia If of the flywheel 324 matches the value in the equation (VI') for the moment of inertia In of the exposure drum 330. When the moment of inertia If of the flywheel 324 is relatively high, the tension of the unexposed film F increases during acceleration and a kick may be easily given to the edge of the perforation by the sprocket tooth 329. During deceleration, a dot shift may be easily generated in latent image exposure by a shock of tension of the unexposed film F when the sag of the section A is removed.

Therefore, it is desirable that the flywheel 324 has a moment of inertia If wherein the lower limit is the value for If0 which is obtained from the equation indicated below and the upper limit is 3 times of the If0 value in the same way as with a constant size film processing machine.

$$In / If0 = 1.13 \tag{VII'}$$

It is desirable to set the pressure of the nip roller 325 for preventing the unexposed film F from sliding on the flywheel 324 to $Ft = 1$ [kgf] in the same way as with a constant size film processing machine.

Assuming that the pressure of the nip roller 325 is Ft and the coefficient of friction generated between the flywheel 324 and the unexposed film F is $\mu t$ in the same way as with a constant size film processing machine, the conditions under which the flywheel 324 and the unexposed film F do not slide mutually are as follows:

$$\mu t \cdot Ft \cdot Rf > If \cdot \alpha / Rf \tag{VIII'}$$

$$\alpha < \mu t \cdot Ft \frac{Rn^2}{In} \{\exp(\mu\theta) - 1\} \tag{IX'}$$

The acceleration during deceleration when sliding occurs, which is calculated from the equation (IX'), is $\alpha = 51$ [m/sec$^2$].

Figure 22:
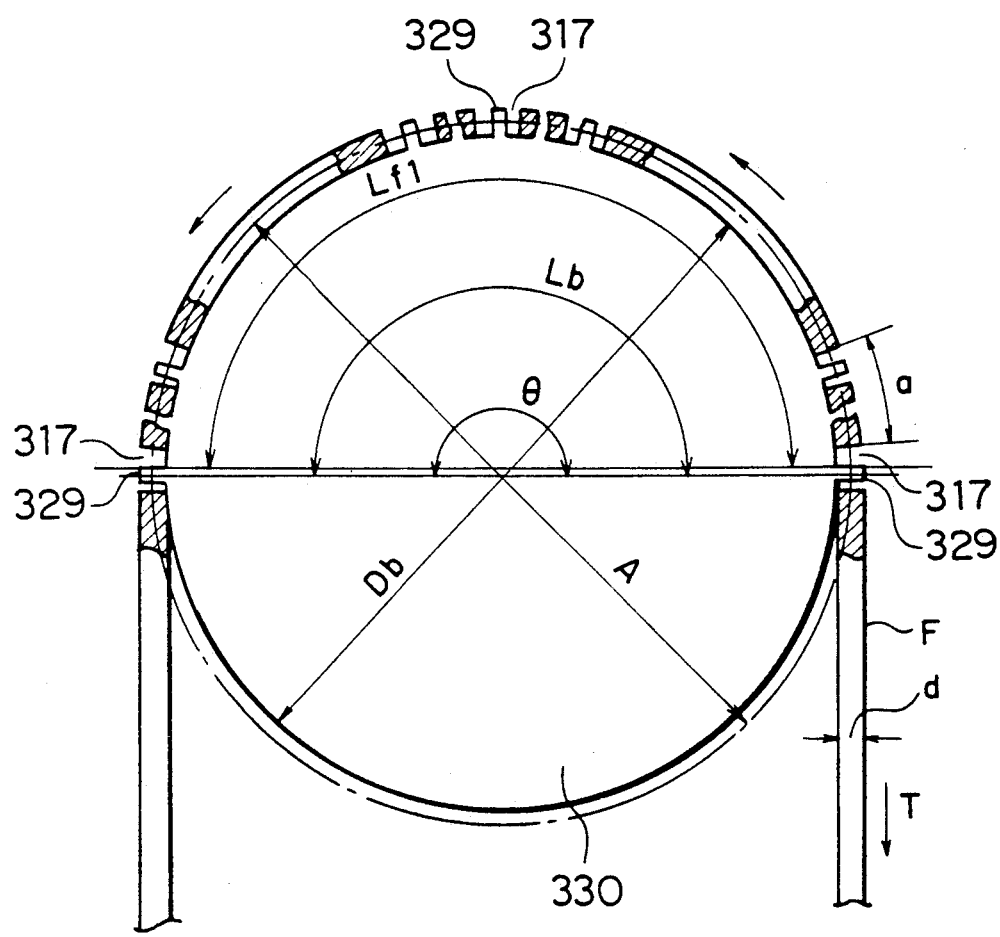
FIGS. 22 and 23 are side views for explaining the operation of an unexposed film on an exposure drum of a latent image exposure device of a free size film processing machine.

Next, the operation of the unexposed film F on the exposure drum 330 will be described in detail with reference to FIG. 22.

The unexposed film F is wound round the exposure drum 330 with each perforation engaged with the sprocket tooth 329, and rotates so that the unexposed film F does not slide on the exposure drum 330. Assuming that the contact angle between the exposure drum 330 and the unexposed film F is $\theta = \pi$ and a tensile strength of $Tn = Tf = 1.0$ [kgf] is applied to the unexposed film F, the tensile strength per area of the unexposed film F is $T = 0.260$ [kgf/mm$^2$]. The theoretically calculated value of the outer diameter D of the exposure drum 307 is as follows in the same way as with a constant size film processing machine:

$$D = \frac{4.75}{\pi} p \left(1 + \frac{T}{E}\right) - d$$

$$= 54.33 \text{ mm}$$

-continued (Film thickness $d = 0.14$ mm)

The most suitable value obtained from the experiment is as follows:

$Db = 54.15 \pm 0.05$ mm

Assuming that the contact angle between the exposure drum 330 with the most suitable outer diameter and the unexposed film F is $\theta = \pi$, the peripheral length difference $\Delta = Lb - Lfl$ between the actual contact length Lb and the theoretically calculated contact length Lfl of the half circle of the unexposed film F ranges from $-0.20$ mm to $-0.36$ mm.

Figure 23:
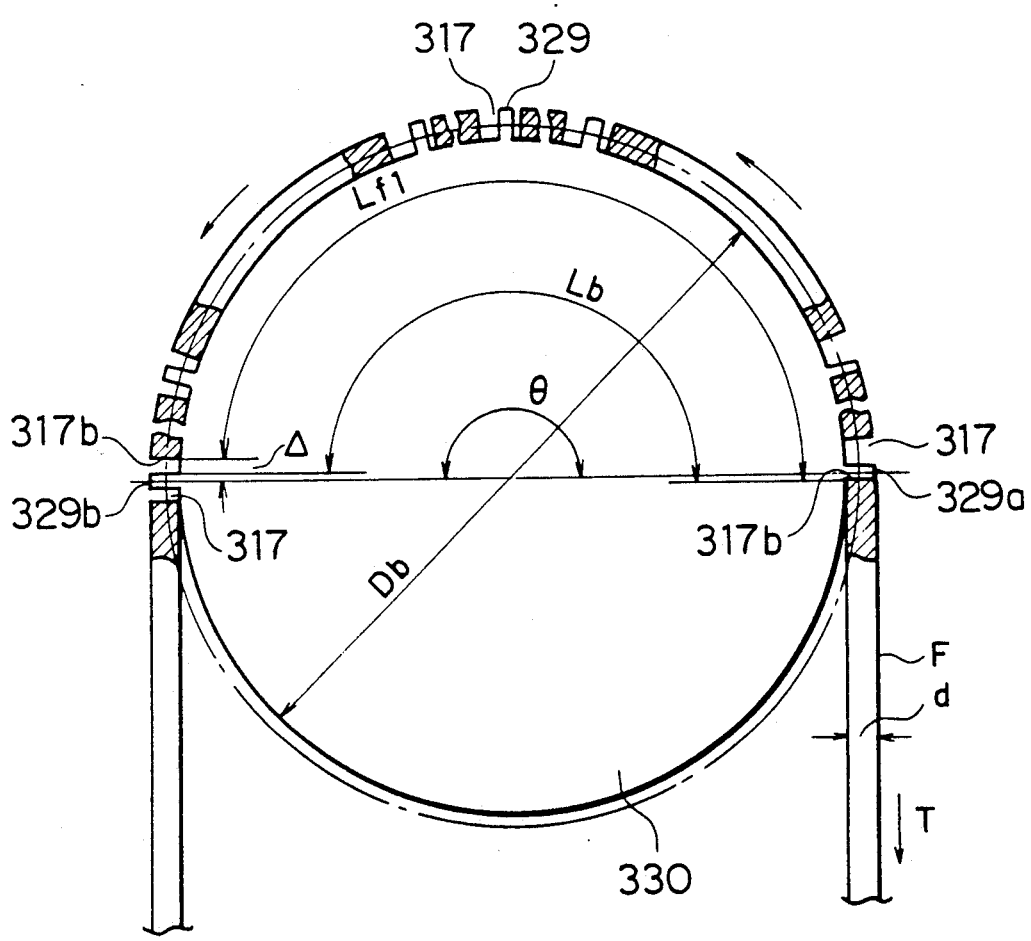
Figure 24:
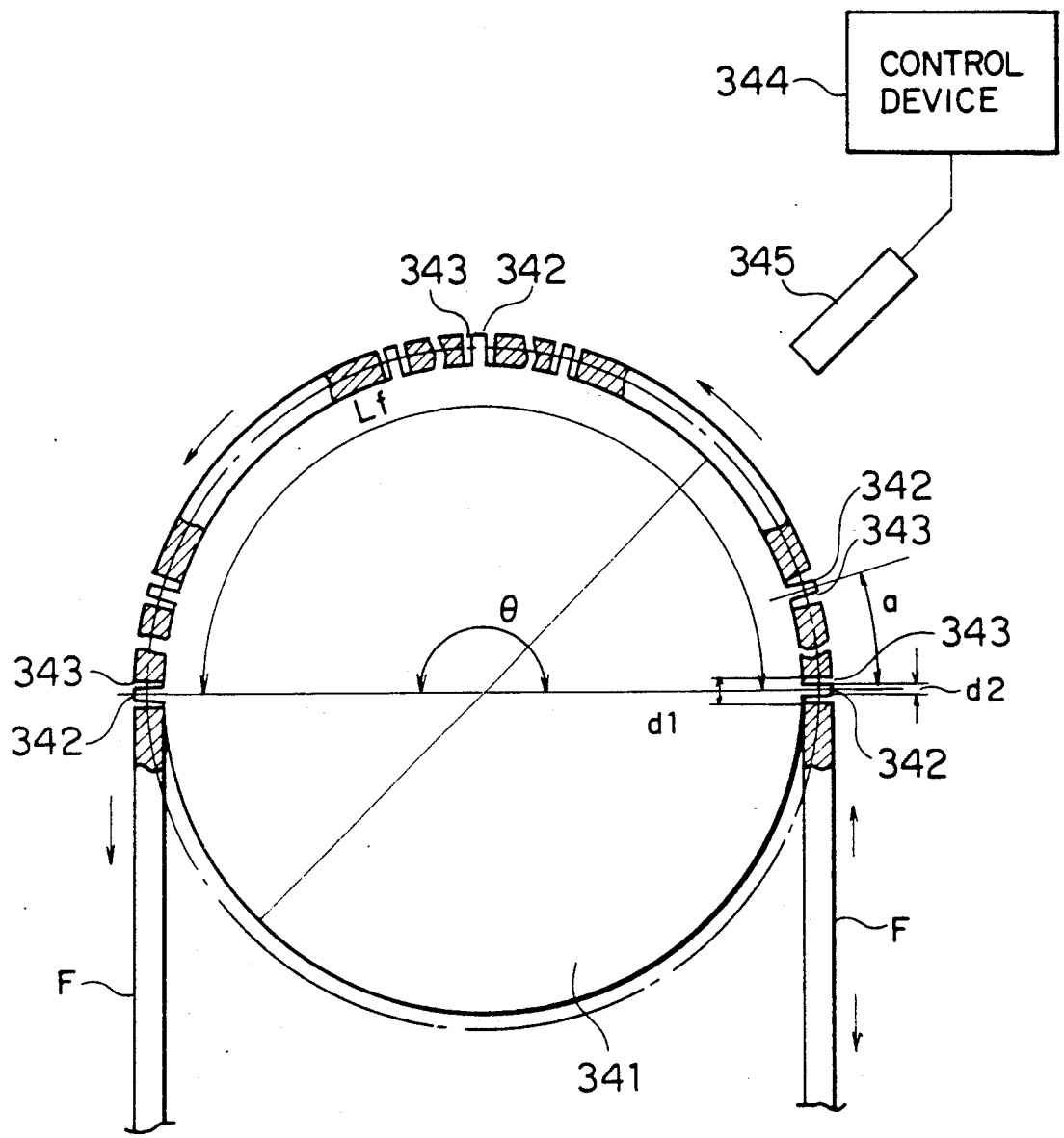
FIG. 24 is a side view for explaining the relationship between sprocket teeth of a conventional exposure drum and perforations of an unexposed film which are engaged with the sprocket teeth.
Figure 25:
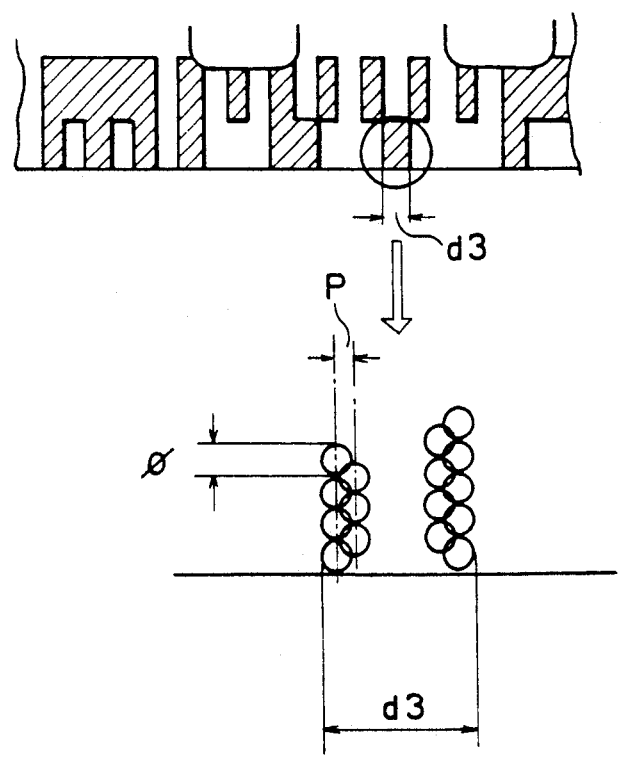
FIG. 25 is an enlarged view of a latent image exposed to an unexposed film F.
Figure 26:
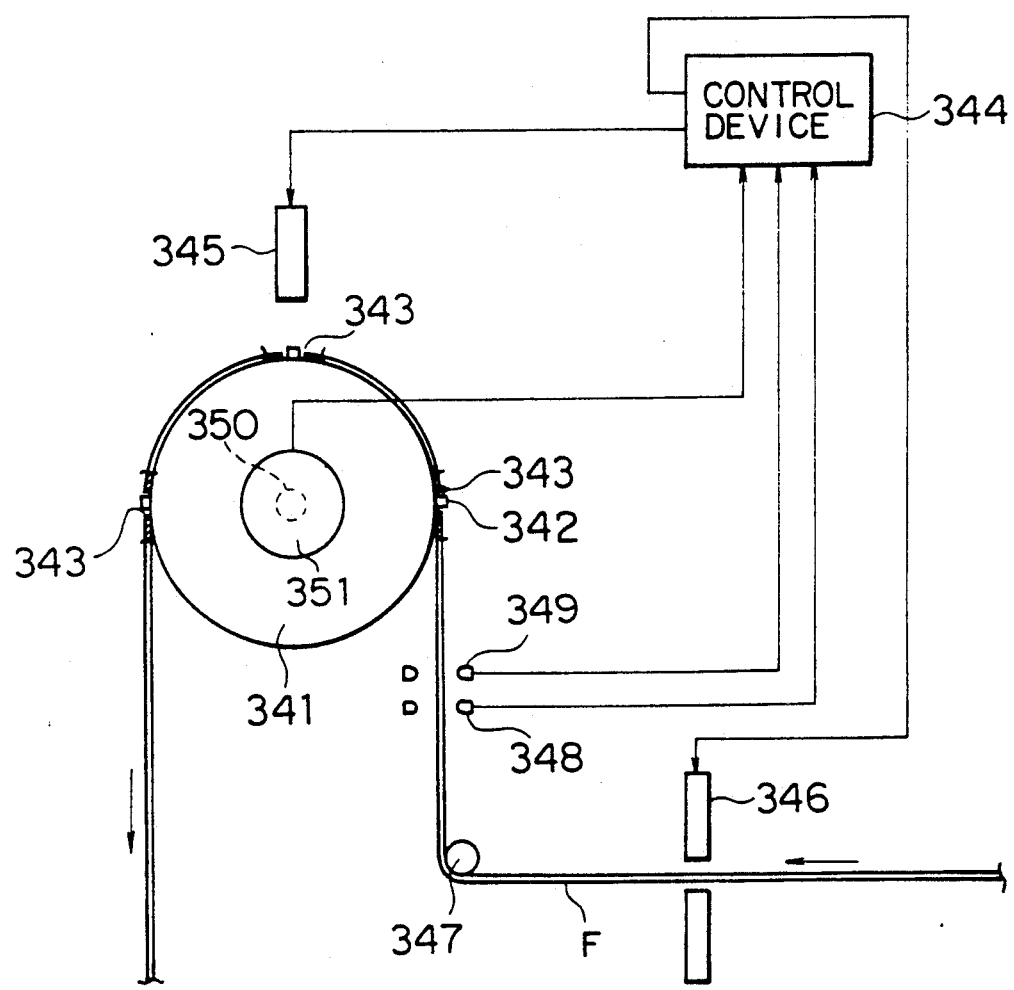
FIG. 26 is a side view showing the film position measurement mechanism Of a conventional latent image exposure device.

When the unexposed film F engaging with the sprocket tooth 329 of the exposure drum 330 with such an outer diameter is fed, the feed rate of the sprocket tooth 329 is higher than that of the unexposed film F from the relationship of $Lb > Lf$, and the sprocket tooth 329a on the feed-in side of the exposure drum 330, finally as shown in FIG. 23, is pressed to the back edge 317b of the perforation 317 in the feed direction for feeding the unexposed film F. For the sprocket tooth 329b on the feed-out side of the exposure drum 330, a gap of $\Delta = 0.20$ mm to 0.36 mm is provided from the back edge 317b of the perforation 317.

When the outer diameter of the exposure drum 330 is extremely larger than the most suitable drum outer diameter Db, the sprocket tooth 329a on the feed-in side does not coincide with the perforation 317 of the unexposed film F and rides on the perforation, and the feed becomes impossible. When the outer diameter of the exposure drum 310 is smaller than Db, the outer diameter becomes close to the theoretical value and it is impossible to press the unexposed film F stably on one side. When the tension applied to the unexposed film F is changed, a relative shift occurs between the perforation 317 and the sprocket tooth 329a.

As described above, the latent image exposure device of the present invention has a flywheel with the predetermined moment of inertia on the ascending side of the exposure drum. The flywheel stabilizes the tension of an unexposed film F on the exposure drum and ensures the frictional force between the exposure drum and the unexposed film so as to prevent mutual sliding.

The latent image exposure device of the present invention further has a flywheel with the predetermined moment of inertia on the descending side of the exposure drum. The flywheel stabilizes the tension of an unexposed film F on the exposure drum and ensures the frictional force between the exposure drum and the unexposed film so as to prevent mutual sliding.

The latent image exposure device further ensures the frictional force between the exposure drum and the unexposed film and has a means for applying the predetermined torque to the rotation shaft of the exposure drum in the unexposed film feed direction so as to keep the sprocket tooth pressed to the back edge of the perforation in the feed direction.

In the latent image exposure device according to claim 5, the contact length between the exposure drum and the unexposed film is shorter than the theoretical contact length by 0.2 to 0.35 mm so as to keep the sprocket tooth for feeding the unexposed film to the exposure drum pressed to the front edge of the perforation in the film feed direction.

In the latent image exposure device of the present invention, the contact length between the exposure drum and the unexposed film is longer than the theoretical contact length by 0.2 to 0.35 mm so as to keep the sprocket tooth for feeding the unexposed film to the exposure drum pressed to the back edge of the perforation in the film feed direction.

As described above, in the present invention, a position shift between the exposure drum and the unexposed film can be eliminated by a simple structure and the exposure accuracy can be improved.

What is claimed is:

1. An apparatus for exposing a plurality of types of unexposed films, each having a predetermined length, to dot patterns corresponding to film and exposure designation data, to form latent dot image designation markings on said unexposed film, said apparatus comprising;

a first memory for storing a library of dot patterns corresponding to designation data for all types of unexposed films to be used in said apparatus, a second memory for storing arrangement data for each type of unexposed film, said arrangement data indicating sequence positions of each of said latent dot image designation markings to be formed from the leading edge to the trailing edge on said unexposed film;

an input control for inputting information corresponding to the actual type of film being used in said apparatus;

a pattern setting control for selecting relevant data patterns from said first memory based on the inputted data, selecting relevant arrangement data from said second memory, and sequencing said dot patterns into a series of dot pattern data corresponding to said actual type of film, whereby each dot image has an address corresponding to a predetermined position on said film;

a third memory for storing the sequence of dot pattern data of said actual type of film, with corresponding addresses, as set by said pattern setting control, upon storage of said sequence of dot pattern data, any previous dot pattern data being erased from said third memory, an exposure device for exposing the film being used;

a conveyor for conveying said film being used to said exposure device at a preset speed, a position signal generator for generating position signals indicating a position on said film being used in synchronization with conveyance of said film being used; whereby said exposure device exposes a series of latent dot images corresponding to said sequence of dot pattern data in said third memory onto the unexposed film being used in response to said position signals, during conveyance of said film being used by said conveyor.

2. The apparatus of claim 1 further comprising a dot pattern generator for producing dot patterns corresponding to said film and exposure designation data.

3. The apparatus of claim 1 wherein said conveyor comprises a rotatable drum around which said film is conveyed, and a rotary encoder to generate said position signals in synchronization with said rotation of said drum.

4. The apparatus of claim 1 wherein said unexposed films are roll films.

5. The apparatus of claim 1 wherein said input control includes a bar code reader to read a bar code designating information relevant to the actual type of film to be used.

6. An apparatus for exposing a plurality of types of unexposed films, each having a predetermined length, to dot patterns corresponding to film and exposure designation data to form latent dot image designation markings on said unexposed film, said apparatus comprising;
   a first memory for storing a series of dot pattern data corresponding to a series of latent dot images to be formed on said film from the leading edge to the trailing edge thereof;
   an exposure device for exposing said film;
   a conveyor for conveying said film to said exposure device at a predetermined speed,
   a timing signal generator for generating timing signals in synchronization with conveyance of said film;
   a control for transferring dot data from said first memory to said exposure device in response to said timing signal;
   said exposure device forming a series of latent dot images based on the transferred dot data in synchronization with the conveyance of said film;
   a monitor for monitoring the exposure device to generate a series of latent dot image data;
   a second memory for storing said series of latent dot image data; and
   a display for displaying latent images based on said series of latent dot image data.

7. The apparatus of claim 6 further comprising a comparator for comparing said series of latent dot image data in said second memory with a series of dot pattern data in said first memory, wherein, when a discrepancy exists between said data from said first memory and said second memory, the discrepancy is indicated on said display.

8. The apparatus of claim 7 wherein said exposure device includes a light emission member which emits a light in response to a driving electric signal, and said monitor monitors said driving electric signal to generate said series of latent dot image data.

* * * * *